US012712745B2

(12) United States Patent
Ou et al.

(10) Patent No.: US 12,712,745 B2
(45) Date of Patent: Aug. 18, 2026

(54) SMART VEHICLE COMMUNICATION METHOD AND RELATED DEVICE

(71) Applicant: Yinwang Intelligent Technologies Co., Ltd., Shenzhen (CN)

(72) Inventors: Gangyan Ou, Shenzhen (CN); Qingdi Sha, Shenzhen (CN); Dafeng Li, Nanjing (CN)

(73) Assignee: YINWANG INTELLIGENT TECHNOLOGIES CO., LTD., Shenzhen (CN)

(*) Notice: Subject to any disclaimer, the term of this patent is extended or adjusted under 35 U.S.C. 154(b) by 21 days.

(21) Appl. No.: 19/039,952

(22) Filed: Jan. 29, 2025

(65) Prior Publication Data

US 2025/0175353 A1 May 29, 2025

Related U.S. Application Data

(63) Continuation of application No. PCT/CN2022/109281, filed on Jul. 30, 2022.

(51) Int. Cl.

*H04L 29/06* (2006.01)
*G06Q 30/0645* (2023.01)
*H04L 9/32* (2006.01)

(52) U.S. Cl.

CPC ....... *H04L 9/3268* (2013.01); *G06Q 30/0645* (2013.01)

(58) Field of Classification Search

CPC . H04L 9/3268; H04L 2209/84; H04L 9/0891; H04L 9/32; H04L 9/3247; H04L 9/3263; H04L 9/40; H04L 63/0869; H04L 63/0823; H04L 9/08; H04L 27/00; H04L 63/0442; G06Q 30/0645; H04W 4/44; H04W 4/40; G07C 9/00174; G07C 9/00571; G07C 9/00896; G07C 2009/00412

See application file for complete search history.

(56) References Cited

U.S. PATENT DOCUMENTS

| | | | | |
|---|---|---|---|---|
| 9,466,162 | B2 * | 10/2016 | Nakai | G07C 9/00309 |
| 10,733,817 | B2 * | 8/2020 | Tang | H04L 63/0435 |
| 11,082,214 | B2 * | 8/2021 | Yasaki | H04L 63/0823 |
| 11,330,429 | B2 * | 5/2022 | Kim | H02J 50/10 |
| 2021/0320909 | A1 * | 10/2021 | Kawabata | H04L 63/0428 |

FOREIGN PATENT DOCUMENTS

| | | | |
|---|---|---|---|
| CN | 1914069 | A | 2/2007 |
| CN | 110570569 | A | 12/2019 |
| CN | 111148068 | A | 5/2020 |
| CN | 111200496 | A | 5/2020 |

(Continued)

*Primary Examiner* — Harunur Rashid

(74) *Attorney, Agent, or Firm* — Conley Rose, P.C.

(57) ABSTRACT

A communication method includes obtaining, from a second electronic device, an operation request comprising a temporary key and a control instruction; checking the temporary key; performing a time validity check based on a first valid time period, wherein the first valid time period corresponds to the temporary key and is stored in a security system of a vehicle; and operating, based on the control instruction, the vehicle when checking the temporary key and the time validity check have succeeded.

18 Claims, 11 Drawing Sheets

(56) References Cited

FOREIGN PATENT DOCUMENTS

| | | | |
|---|---|---|---|
| CN | 111572493 | A | 8/2020 |
| CN | 111845624 | A | 10/2020 |
| CN | 112039951 | A | 12/2020 |
| CN | 112105000 | A | 12/2020 |
| CN | 112396735 | A | 2/2021 |
| CN | 113766450 | A | 12/2021 |
| EP | 2743868 | A1 | 6/2014 |
| EP | 3490219 | A1 | 5/2019 |
| JP | 2006233475 | A | 9/2006 |
| JP | 2019116791 | A | 7/2019 |
| KR | 20140000050 | A | 1/2014 |
| WO | 2013076760 | A1 | 5/2013 |
| WO | 2018003919 | A1 | 1/2018 |

* cited by examiner

200
Server
PKI server
Smart key server
300
Vehicle
Vehicle-mounted short-range controller
Smart vehicle key
100
Electronic device
Application

SMART VEHICLE COMMUNICATION METHOD AND RELATED DEVICE

CROSS-REFERENCE TO RELATED APPLICATIONS

This is a continuation of International Patent Application No. PCT/CN2022/109281 filed on Jul. 30, 2022, which is hereby incorporated by reference in its entirety.

TECHNICAL FIELD

Embodiments of this disclosure relate to the field of security, and in particular, to a communication method and a related device.

BACKGROUND

With rapid development of the mobile Internet, mobile phone applications such as a mobile manager can integrate a control function of a mobile phone into a module of a vehicle, to realize intelligent interconnection between the mobile phone and the vehicle, so that a user can operate the vehicle in a comfortable and convenient manner. A smart vehicle key can not only replace a traditional vehicle key, but also provide functions such as mobile phone remote start, passive entry, and automatic vehicle door opening and closing.

However, a network security level of the smart vehicle key is far from meeting corresponding requirements. Consequently, a network security problem of the smart vehicle key is very prominent. For example, the smart vehicle key faces a huge security risk in a generation, distribution, use, and update process. The smart vehicle key in the industry cannot implement end-to-end full-life-cycle security. Therefore, the smart vehicle key is at a risk of being attacked in some weak links, and this brings huge economic losses to users and original equipment manufacturers (OEMs). The network security problem of the smart vehicle key is one of top 3 network attacks of current smart vehicles. Therefore, to avoid the network security problem, it is necessary to ensure network security of an entire smart vehicle key system on a cloud, a mobile phone, and a vehicle in an end-to-end manner, and network security levels of the cloud, the mobile phone, and the vehicle need to be improved to a same high security level. How to ensure end-to-end network security becomes a systematic problem that needs to be resolved urgently.

SUMMARY

Embodiments of this disclosure provide a communication method and a related device, to provide a manner of uploading, distributing, and using a smart vehicle key, so that network security of the smart vehicle key can be improved.

According to a first aspect, an embodiment of this disclosure provides a communication method, applied to a vehicle, where the vehicle includes a smart vehicle key, the smart vehicle key is electronic key information used to control the vehicle, and the communication method includes determining key credential information based on the smart vehicle key, and sending the key credential information to a server.

In embodiments of this disclosure, network security of the smart vehicle key can be improved in a process of uploading the smart vehicle key to the server.

In a possible implementation, determining key credential information based on the smart vehicle key includes encrypting the smart vehicle key by using the smart vehicle key as a key, to obtain the key credential information.

In embodiments of this disclosure, the smart vehicle key is encrypted by using the smart vehicle key as a key, so that security of the smart vehicle key can be improved.

In a possible implementation, the vehicle further includes vehicle identity identification information corresponding to the vehicle, and determining key credential information based on the smart vehicle key includes signing the smart vehicle key and the vehicle identity identification information by using a first private key, to obtain signature data, obtaining a second public key, and encrypting the signature data, the smart vehicle key, and the vehicle identity identification information by using the second public key, to obtain a first ciphertext, where the second public key is sent by the server to the vehicle, and generating the key credential information based on the first ciphertext and a first public key, where the first public key corresponds to the first private key.

In embodiments of this disclosure, the smart vehicle key and the vehicle identity identification information are signed by using a private key, and the signature data, the smart vehicle key, and the vehicle identity identification information are encrypted by using a public key, so that security of the smart vehicle key can be improved.

In a possible implementation, the method further includes sending a first certificate to the server, where the first certificate includes the vehicle identity identification information and the first public key, the first certificate is issued to the vehicle after being signed by a third-party authority, and the first certificate is used to verify the first public key.

In embodiments of this disclosure, the first certificate is sent, so that the server can verify an identity of the vehicle based on the first certificate, and security can be improved.

In a possible implementation, the method further includes verifying the second public key based on a second certificate.

In embodiments of this disclosure, the second public key is verified by using the second certificate, so that it can be ensured that the second public key is sent by the server, another person is prevented from tampering with the first public key, and security of encrypted data can be ensured.

In a possible implementation, before verifying the second public key based on a second certificate, the method further includes receiving the second certificate sent by the server, where the second certificate includes identity information of the server and the second public key, and the second certificate is issued to the server after being signed by the third-party authority.

In embodiments of this disclosure, the second certificate is received, so that an identity of the server may be verified based on the second certificate. Therefore, security can be improved.

In a possible implementation, the vehicle pre-stores a root certificate, the root certificate is used to check a certificate, and after receiving the second certificate sent by the server, the method further includes performing signature verification on the second certificate based on the root certificate.

In embodiments of this disclosure, signature verification is performed on the second certificate by using the root certificate, so that authenticity of the second certificate can be ensured, and the second certificate is prevented from being forged.

In a possible implementation, the second certificate is preset in the vehicle.

In a possible implementation, the first public key and the first private key are generated in a security module of the vehicle.

In embodiments of this disclosure, because the first public key and the first private key are generated in the security module of the vehicle, security of the first public key and the first private key can be improved.

In a possible implementation, the smart vehicle key is generated in a factory mode of the vehicle.

In embodiments of this disclosure, because the smart vehicle key is generated in the factory mode of the vehicle, security of the smart vehicle key can be improved.

In a possible implementation, the method further includes periodically updating the key credential information based on the smart vehicle key, and sending updated key credential information to the server.

In embodiments of this disclosure, the smart vehicle key is periodically updated, so that security of the smart vehicle key can be improved.

In a possible implementation, after sending updated key credential information to the server, the method further includes sending a key update prompt to a first electronic device, to prompt a user to update the smart vehicle key.

In embodiments of this disclosure, the user is reminded, in an active reminding manner, to update the smart vehicle key, so that user experience can be improved.

In a possible implementation, the method further includes receiving a key update request sent by a first electronic device, where the key update request is used to request to generate a new smart vehicle key, determining new key credential information based on the new smart vehicle key, and sending the new key credential information to the server.

In embodiments of this disclosure, the smart vehicle key is updated in a manner of a user-initiated request, so that flexibility of updating the smart vehicle key can be improved, and security of the smart vehicle key can also be improved.

In a possible implementation, the key update request includes the old smart vehicle key, and before determining new key credential information based on the new smart vehicle key, the method further includes performing authentication on the old smart vehicle key.

In embodiments of this disclosure, before the smart vehicle key is updated, authentication is performed on the old smart vehicle key, to prevent an unauthorized user from maliciously stealing the smart vehicle key, so that security of the smart vehicle key can be improved.

In a possible implementation, the method further includes, if it is detected that authentication on a request of the first electronic device for using the new smart vehicle key succeeds, deleting the old smart vehicle key in the vehicle.

In embodiments of this disclosure, after the smart vehicle key is successfully updated, the old smart vehicle key is deleted, so that storage resources of the vehicle can be effectively saved.

According to a second aspect, an embodiment of this disclosure further provides a communication method, applied to a vehicle, and including sending a random value to a first electronic device, receiving a first control message sent by the first electronic device, where the first control message is generated based on a smart vehicle key and the random value, and checking the first control message based on the smart vehicle key and the random value, and controlling the vehicle based on the first control message if the check succeeds.

In embodiments of this disclosure, network security of the smart vehicle key can be effectively improved in a process of using the key.

In a possible implementation, checking the first control message based on the smart vehicle key and the random value includes generating a second control message based on the smart vehicle key and the random value, and comparing the second control message with the first control message, and the controlling the vehicle based on the first control message if the check succeeds includes, if the first control message is consistent with the second control message, controlling the vehicle based on the first control message.

In embodiments of this disclosure, consistency of the control messages can be verified by performing consistency check on the control messages, so that network security of the smart vehicle key can be improved.

According to a third aspect, an embodiment of this disclosure further provides a communication method, applied to a vehicle, and including obtaining an operation request sent by a second electronic device, where the operation request includes a temporary key and a control instruction, checking the temporary key, performing a time validity check based on a first valid time period, where the first valid time period is used to represent a valid time period of the temporary key, and the first valid time period is stored in a security module of the vehicle, and if the check of the temporary key succeeds and the time validity check succeeds, operating the vehicle based on the control instruction of the second electronic device.

In embodiments of this disclosure, network security of the smart vehicle key can be effectively improved in a process in which a user borrows a vehicle.

In a possible implementation, before obtaining an operation request sent by a second electronic device, the method further includes obtaining a vehicle use request, where the vehicle use request includes the first valid time period, generating the temporary key based on the first valid time period, and sending the temporary key to a server.

In embodiments of this disclosure, the user can effectively borrow the vehicle in a case in which the vehicle is connected to a network.

In a possible implementation, the vehicle use request is sent by the first electronic device in a short-range communication manner.

In embodiments of this disclosure, the first electronic device directly communicates with the vehicle, so that operations of the user can be simplified, and user experience can be improved.

In a possible implementation, the vehicle use request is sent by the first electronic device through a mobile network.

In embodiments of this disclosure, the user can remotely control the vehicle, so that the user can conveniently control the vehicle.

In a possible implementation, the vehicle use request is sent by a vehicle rental platform.

In embodiments of this disclosure, a third party may control the vehicle.

In a possible implementation, the vehicle use request further includes a signed smart vehicle key, the signed smart vehicle key is obtained by signing a smart vehicle key by using a third private key, and after obtaining a vehicle use request, the method further includes performing signature verification on the smart vehicle key based on a third public key, where the third public key is sent by the first electronic device to the vehicle.

In a possible implementation, the method further includes sending a first certificate to the first electronic device, where the first certificate includes vehicle identity identification information and a first public key, the first certificate is issued to the vehicle after being signed by a third-party authority, and the first certificate is used to verify the first public key.

In a possible implementation, the third public key is verified based on a third certificate.

In a possible implementation, before verifying the third public key based on a third certificate, the method further includes receiving the third certificate sent by the first electronic device, where the third certificate includes identity information of the first electronic device and the third public key, and the third certificate is issued to the first electronic device after being signed by a third-party authority.

In a possible implementation, the vehicle pre-stores a root certificate, and the root certificate is used to verify a certificate, and after receiving the third certificate sent by the first electronic device, the method further includes performing signature verification on the third certificate based on the root certificate.

In a possible implementation, the first valid time period is encrypted by using the smart vehicle key, and after performing authentication by using the smart vehicle key, the method further includes decrypting an encrypted first valid time period by using the smart vehicle key, and performing secure storage on a decrypted first valid time period.

In a possible implementation, the method further includes receiving encrypted data sent by the second electronic device, where the encrypted data is obtained by encrypting a temporary credential and the first valid time period by using a smart vehicle key, the smart vehicle key is stored in a first electronic device, and the temporary credential is generated by the first electronic device, decrypting the encrypted data by using the smart vehicle key, to obtain the temporary credential and the first valid time period, checking the temporary credential and the first valid time period, if the check succeeds, generating the temporary key, and encrypting the temporary key based on the encrypted data, to obtain an encrypted temporary key, and sending the encrypted temporary key to the second electronic device.

In embodiments of this disclosure, the user can effectively borrow the vehicle in a case in which the vehicle is not connected to a network.

In a possible implementation, after the generating the temporary key, the method further includes performing secure storage on the first valid time period.

In a possible implementation, the temporary credential is generated based on the smart vehicle key and the first valid time period, and the encrypted data is sent by the first electronic device to a server.

In a possible implementation, the operation request includes an encrypted temporary key, the encrypted temporary key is obtained after being encrypted by using a first public key, and before checking the temporary key, the method further includes decrypting the encrypted temporary key by using a first private key, to obtain the temporary key.

In a possible implementation, the method further includes sending a first certificate to the second electronic device, where the first certificate includes vehicle identity identification information and the first public key, the first certificate is issued to the vehicle after being signed by a third-party authority, and the first certificate is used to verify the first public key.

In a possible implementation, the method further includes verifying a fourth public key based on a fourth certificate, where the fourth public key is sent by the second electronic device to the vehicle.

In a possible implementation, before verifying a fourth public key based on a fourth certificate, the method further includes receiving the fourth certificate sent by the second electronic device, where the fourth certificate includes identity information of the second electronic device and the fourth public key, and the fourth certificate is issued to the second electronic device after being signed by a third-party authority.

In a possible implementation, the vehicle pre-stores a root certificate, the root certificate is used to check a certificate, and after receiving the fourth certificate sent by the second electronic device, the method further includes performing signature verification on the fourth certificate based on the root certificate.

In a possible implementation, checking the temporary key includes sending a random value to the second electronic device, receiving a first control message sent by the second electronic device, where the first control message is generated based on the temporary key and the random value, and performing a temporary key check on the first control message based on the temporary key and the random value.

In a possible implementation, the method further includes sending a key invalidation notification to the second electronic device, where the key invalidation notification indicates that the temporary key is invalid.

In embodiments of this disclosure, the user is reminded that the temporary key is invalid in an active reminding manner, so that the user can be prevented from incorrectly using the temporary key, and user experience can be improved.

In a possible implementation, before sending a key invalidation notification to the second electronic device, the method further includes, if it is detected that a current system time exceeds the first valid time period, setting the temporary key to be invalid.

In a possible implementation, the method further includes, if the time validity check fails, prompting the user that the temporary key is expired.

According to a fourth aspect, an embodiment of this disclosure further provides a communication method, applied to a server, and including receiving key credential information, and performing secure storage on the key credential information, where the secure storage is storage performed by using a secure encryption means.

In embodiments of this disclosure, network security of a smart vehicle key can be improved in a process of uploading the smart vehicle key to the server.

In a possible implementation, the key credential information includes a first ciphertext and a first public key, and performing secure storage on the key credential information includes decrypting the first ciphertext by using a second private key, to obtain signature data, a smart vehicle key, and vehicle identity identification information, performing signature verification on the signature data by using the first public key, and if the signature verification succeeds, performing secure storage on the smart vehicle key and the vehicle identity identification information.

In a possible implementation, the method further includes obtaining a third public key, and encrypting the smart vehicle key by using the third public key, to obtain an encrypted smart vehicle key, where the third public key is sent by a first electronic device to the server, and sending the encrypted smart vehicle key to the first electronic device.

In embodiments of this disclosure, the smart vehicle key is encrypted by using the third public key and then sent to the first electronic device, so that security of the smart vehicle key can be improved.

In a possible implementation, before sending the encrypted smart vehicle key to the first electronic device, the method further includes receiving a registration request, where the registration request includes a user account and vehicle identity identification information corresponding to the user account, and creating the user account based on the registration request, where the user account corresponds to the smart vehicle key and the vehicle identity identification information.

In embodiments of this disclosure, a user registers with the server, so that the server can perform account verification on the user before sending the smart vehicle key, and security of the smart vehicle key can be improved.

In a possible implementation, the method further includes sending a second certificate to a vehicle, where the second certificate includes identity information of the server and a second public key, the second certificate is issued to the server after being signed by a third-party authority, and the second certificate is used to verify the second public key.

In a possible implementation, the method includes verifying the first public key based on a first certificate.

In a possible implementation, before verifying the first public key based on a first certificate, the method further includes receiving the first certificate sent by a vehicle, where the first certificate includes the vehicle identity identification information and the first public key, and the first certificate is issued to the vehicle after being signed by a third-party authority.

In a possible implementation, the server pre-stores a root certificate, the root certificate is used to verify a certificate, and after verifying the first public key based on a first certificate, the method further includes performing signature verification on the first certificate based on the root certificate.

In a possible implementation, the first certificate is preset in the server.

In a possible implementation, the first public key is generated in a security module of a vehicle.

In a possible implementation, the smart vehicle key is generated in a factory mode of the vehicle.

In a possible implementation, after receiving key credential information, the method further includes periodically receiving the key credential information, to periodically update the key credential information.

In a possible implementation, after the periodically receiving the key credential information, the method further includes sending a key update prompt to a first electronic device, to prompt a user to update the smart vehicle key.

In a possible implementation, the method further includes receiving a credential update indication, where the credential update indication indicates to update the key credential information, and the credential update indication includes new key credential information, and updating the key credential information based on the credential update indication.

In a possible implementation, the credential update indication further includes the old smart vehicle key, the old smart vehicle key is stored in the server, the new key credential information includes a new smart vehicle key, and before the updating the key credential information based on the credential update indication, the method further includes performing authentication on the old smart vehicle key.

In a possible implementation, the method further includes, if it is detected that authentication on the new key credential information succeeds, storing the new key credential information, and deleting the old key credential information.

According to a fifth aspect, an embodiment of this disclosure further provides a communication method, applied to a server, and including receiving a key obtaining request sent by a second electronic device, where the key obtaining request is used to request to obtain first information, and the first information is used to determine a temporary key, and sending the first information to the second electronic device.

In a possible implementation, the first information is the temporary key, and sending the first information to the second electronic device includes encrypting the temporary key by using a fourth public key, and sending an encrypted temporary key to the second electronic device, where the fourth public key is sent by the second electronic device to the server.

In a possible implementation, the temporary key is sent by a vehicle to the server.

In a possible implementation, the first information is encrypted data, and sending the first information to the second electronic device includes sending the encrypted data to the second electronic device, where the encrypted data is obtained by encrypting a temporary credential and a first valid time period by using a smart vehicle key, the smart vehicle key is stored in a first electronic device, the temporary credential is generated by the first electronic device, and the first valid time period is used to represent a valid time period of the temporary key.

In a possible implementation, the encrypted data is sent by the first electronic device to the server.

In a possible implementation, the key obtaining request includes a temporary account, and the key obtaining request is used to request to obtain the first information corresponding to the temporary account.

According to a sixth aspect, an embodiment of this disclosure provides a communication method, applied to a first electronic device, and including receiving a random value sent by a vehicle, obtaining a smart vehicle key, and generating a first control message based on the smart vehicle key and the random value, where the first control message is used to control the vehicle, and sending the first control message to the vehicle.

In embodiments of this disclosure, vehicle security can be improved in a process in which a user controls the vehicle by using a key.

In a possible implementation, the first control message is generated in a trusted execution environment (TEE).

In embodiments of this disclosure, the first control message is generated in the TEE, so that security of the first control message can be improved, the first control message is prevented from being stolen, and vehicle security can be improved.

In a possible implementation, obtaining a smart vehicle key includes receiving an encrypted smart vehicle key sent by a server, where the encrypted smart vehicle key is obtained by the server by encrypting the smart vehicle key by using a third public key, and the third public key is sent by the first electronic device to the server, and decrypting the encrypted smart vehicle key by using a third private key, to obtain the smart vehicle key.

In a possible implementation, the third public key and the third private key are generated in a TEE of the first electronic device.

In embodiments of this disclosure, the third public key and the third private key are generated in the TEE, so that security of the third public key and the third private key can be improved, the third public key and the third private key are prevented from being stolen, and vehicle security can be improved.

In a possible implementation, the decrypting the encrypted smart vehicle key by using a third private key, to obtain the smart vehicle key includes decrypting, in a TEE of the first electronic device, the encrypted smart vehicle key by using the third private key, to obtain the smart vehicle key, and after the decrypting the encrypted smart vehicle key by using a third private key, to obtain the smart vehicle key, the method further includes storing the smart vehicle key in the TEE of the first electronic device.

In embodiments of this disclosure, decryption and storage operations are performed in the TEE, so that security of the smart vehicle key can be improved.

In a possible implementation, before receiving an encrypted smart vehicle key sent by a server, the method further includes sending a key request to the server, where the key request includes a user account, and the key request is used to obtain a smart vehicle key corresponding to the user account.

In a possible implementation, the method further includes sending a key update request to the vehicle, where the key update request is used to generate a new smart vehicle key, and obtaining the new smart vehicle key from a server.

In a possible implementation, after obtaining the new smart vehicle key from a server, the method further includes performing authentication on the vehicle by using the new smart vehicle key, and if the authentication succeeds, deleting the old smart vehicle key in the first electronic device.

According to a seventh aspect, an embodiment of this disclosure provides a communication method, applied to a first electronic device, and including sending second information in response to a detected vehicle use operation of a user, where the second information is used to determine a temporary key.

In a possible implementation, sending second information in response to a detected vehicle use operation of a user includes sending a vehicle use request to a vehicle in response to the detected vehicle use operation of the user, where the vehicle use request includes a first valid time period.

In a possible implementation, the first valid time period is encrypted by using a smart vehicle key.

In a possible implementation, the vehicle use request further includes a smart vehicle key.

In a possible implementation, sending second information in response to a detected vehicle use operation of a user includes generating a temporary credential based on a smart vehicle key and a first valid time period in response to the detected vehicle use operation of the user, and encrypting the temporary credential and the first valid time period by using the smart vehicle key, to obtain encrypted data, and sending the encrypted data to a server.

According to an eighth aspect, an embodiment of this disclosure provides a communication method, applied to a second electronic device, and including sending a key obtaining request to a server, where the key obtaining request is used to request to obtain first information, and the first information is used to determine a temporary key, receiving the first information sent by the server, and sending an operation request to a vehicle based on the first information, where the operation request includes the temporary key and a control instruction, and the control instruction is used to operate the vehicle.

In a possible implementation, the first information is an encrypted temporary key, the encrypted temporary key is obtained by encrypting the temporary key by using a fourth public key, and after receiving the first information sent by the server, the method further includes decrypting the encrypted temporary key by using the fourth private key, to obtain the temporary key.

In a possible implementation, the first information is encrypted data, the encrypted data is obtained by encrypting a temporary credential and a first valid time period by using a smart vehicle key, the smart vehicle key is stored in a first electronic device, the temporary credential is generated by the first electronic device, and the first valid time period is used to represent a valid time period of the temporary key.

In a possible implementation, the method further includes receiving a key invalidation notification, where the key invalidation notification indicates that the temporary key is invalid.

In a possible implementation, the key obtaining request further includes a temporary account, and the key obtaining request is used to request to obtain the first information corresponding to the temporary account.

According to a ninth aspect, an embodiment of this disclosure further provides a communication method, applied to a vehicle rental platform, and including obtaining a first valid time period, obtaining a smart vehicle key from a server, and encrypting the first valid time period by using the smart vehicle key as a key, and sending an encrypted first valid time period to a vehicle.

In embodiments of this disclosure, the valid time period may be set for the smart vehicle key, so that a user can effectively rent the vehicle.

In a possible implementation, the method further includes applying for a temporary account from the server, where the temporary account corresponds to a temporary key, and sending the temporary account to a second electronic device.

In a possible implementation, the method further includes sending a key invalidation notification, where the key invalidation notification indicates that the temporary key is invalid.

In embodiments of this disclosure, a notification may indicate that a temporary vehicle rental key is invalid, so that rental termination may be completed in a special scenario such as an early rental termination scenario, and rental termination efficiency can be improved.

According to a tenth aspect, an embodiment of this disclosure provides a communication apparatus, including one or more function modules, where the one or more function modules are configured to perform the communication method according to any one of the first aspect to the third aspect.

According to an eleventh aspect, an embodiment of this disclosure further provides a communication apparatus, including one or more function modules, where the one or more function modules are configured to perform the communication method according to the fourth aspect or the fifth aspect.

According to a twelfth aspect, an embodiment of this disclosure further provides a communication apparatus, including one or more function modules, where the one or more function modules are configured to perform the communication method according to the sixth aspect or the seventh aspect.

According to a thirteenth aspect, an embodiment of this disclosure further provides a communication apparatus, including one or more function modules, where the one or more function modules are configured to perform the communication method according to the eighth aspect.

According to a fourteenth aspect, an embodiment of this disclosure further provides a communication apparatus, including one or more function modules, where the one or more function modules are configured to perform the communication method according to the ninth aspect.

According to a fifteenth aspect, an embodiment of this disclosure provides a vehicle, including a processor and a memory, where the memory is configured to store a computer program, and the processor is configured to run the computer program, to perform the communication method according to any one of the first aspect to the third aspect.

According to a sixteenth aspect, an embodiment of this disclosure provides a server, including a processor and a memory, where the memory is configured to store a computer program, and the processor is configured to run the computer program, to perform the communication method according to the fourth aspect or the fifth aspect.

According to a seventeenth aspect, an embodiment of this disclosure provides a first electronic device, including a processor and a memory, where the memory is configured to store a computer program, and the processor is configured to run the computer program, to perform the communication method according to the sixth aspect or the seventh aspect.

According to an eighteenth aspect, an embodiment of this disclosure provides a second electronic device, including a processor and a memory, where the memory is configured to store a computer program, and the processor is configured to run the computer program, to perform the communication method according to the eighth aspect.

According to a nineteenth aspect, an embodiment of this disclosure provides a vehicle rental platform, including a processor and a memory, where the memory is configured to store a computer program, and the processor is configured to run the computer program, to perform the communication method according to the ninth aspect.

According to a twentieth aspect, an embodiment of this disclosure provides a computer-readable storage medium. The computer-readable storage medium stores a computer program, and when the computer program runs on a computer, the computer is enabled to implement the communication method according to any one of the first aspect to the ninth aspect.

According to a twenty-first aspect, a communication system is provided, including the vehicle provided in the fifteenth aspect, the server provided in the sixteenth aspect, and the first electronic device provided in the seventeenth aspect.

DESCRIPTION OF EMBODIMENTS

Figure 1:
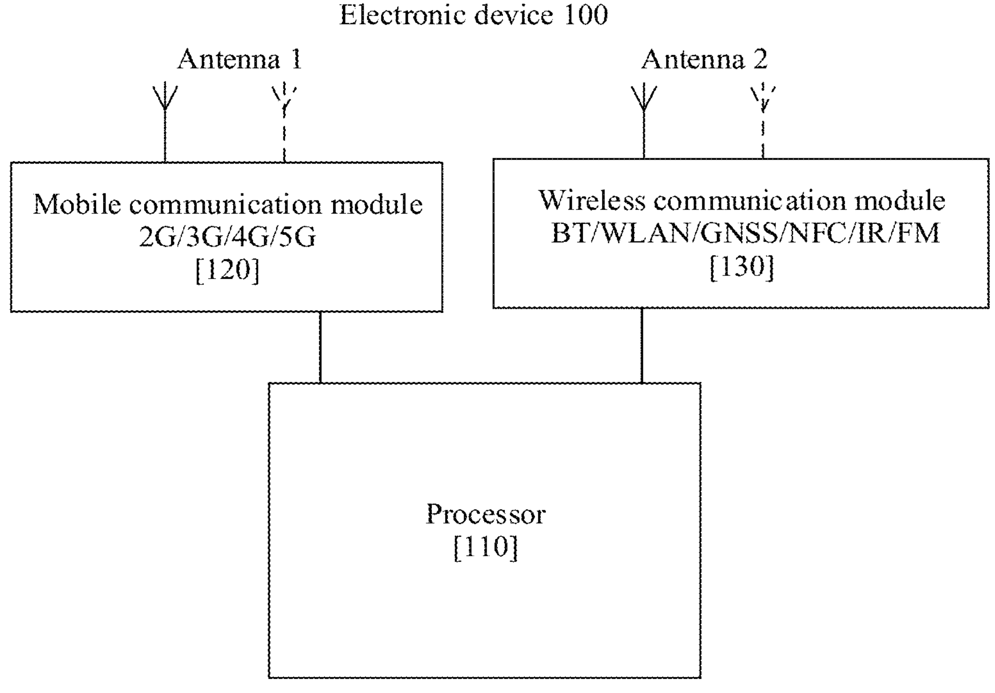
FIG. 1 is a schematic diagram of a hardware structure of an electronic device according to an embodiment of this disclosure.

The following describes the technical solutions in embodiments of this disclosure with reference to the accompanying drawings in embodiments of this disclosure. In the descriptions of embodiments of this disclosure, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments of this disclosure, unless otherwise specified, "a plurality of" means two or more than two.

With rapid development of the mobile Internet, mobile phone applications such as a mobile manager can integrate a control function of a mobile phone into a module of a vehicle, to realize intelligent interconnection between the mobile phone and the vehicle, so that a user can operate the vehicle in a comfortable and convenient manner. A smart vehicle key can not only replace a traditional vehicle key, but also provide functions such as mobile phone remote start, passive entry, and automatic vehicle door opening and closing.

However, a network security level of the smart vehicle key is far from meeting corresponding requirements. Consequently, a network security problem of the smart vehicle key is very prominent. For example, the smart vehicle key faces a huge security risk in a generation, distribution, use, and update process. The smart vehicle key in the industry cannot implement end-to-end full-life-cycle security. Therefore, the smart vehicle key is at a risk of being attacked in some weak links, and this brings huge economic losses to users and OEMs. The network security problem of the smart vehicle key is one of top 3 network attacks of current smart vehicles. Therefore, to avoid the network security problem, it is necessary to ensure network security of an entire smart vehicle key system on a cloud, a mobile phone, and a vehicle in an end-to-end manner, and network security levels of the cloud, the mobile phone, and the vehicle need to be improved to a same high security level. How to ensure end-to-end network security becomes a systematic problem that needs to be resolved urgently.

Based on the foregoing problem, an embodiment of this disclosure provides a communication method, applied to an electronic device 100, a server 200, and a vehicle 300. The electronic device 100 may be a mobile terminal having a display. The mobile terminal may alternatively be referred to as a terminal device, user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. Alternatively, the mobile terminal may be a wearable device, such as a smart watch or a smart band. A specific form of the electronic device 100 that performs the technical solutions is not specially limited in embodiments of this disclosure. The server 200 may be a physical server, or may be a virtual cloud server. A specific form of the server 200 that performs the technical solutions is not specially limited in embodiments of this disclosure. The vehicle 300 may be a smart vehicle with a smart key system.

The following first describes an example of an electronic device provided in the following embodiments of this disclosure with reference to FIG. 1. FIG. 1 is a schematic diagram of a structure of the electronic device 100.

The electronic device 100 may include a processor 110, an antenna 1, an antenna 2, a mobile communication module 120, and a wireless communication module 130.

It may be understood that the structure shown in this embodiment of the present disclosure does not constitute a specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access, reduces a waiting time of the processor 110, and improves system efficiency.

A wireless communication function of the electronic device 100 may be implemented by using the antenna 1, the antenna 2, the mobile communication module 120, the wireless communication module 130, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 120 may provide a wireless communication solution that is applied to the electronic device 100 and that includes second generation (2G)/third generation (3G)/fourth generation (4G)/fifth generation (5G). The mobile communication module 120 may include at least one filter, a switch, a power amplifier, a low-noise amplifier (LNA), and the like. The mobile communication module 120 may receive an electromagnetic wave through the antenna 1, perform processing such as filtering or amplification on the received electromagnetic wave, and transmit the electromagnetic wave to the modem processor for demodulation. The mobile communication module 120 may further amplify a signal modulated by the modem processor, and convert the signal into an electromagnetic wave for radiation through the antenna 1. In some embodiments, at least some function modules in the mobile communication module 120 may be disposed in the processor 110. In some embodiments, at least some function modules in the mobile communication module 120 may be disposed in a same device as at least some modules of the processor 110.

The modem processor may include a modulator and a demodulator. The modulator is configured to modulate a to-be-transmitted low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. In some embodiments, the modem processor may be an independent component. In some other embodiments, the modem processor may be independent of the processor 110, and is disposed in a same device as the mobile communication module 120 or another function module.

The wireless communication module 130 may provide a wireless communication solution that is applied to the electronic device 100 and that includes a wireless local area network (WLAN) (for example, a WI-FI network), BLUETOOTH (BT), a global navigation satellite system (GNSS), frequency modulation (FM), a near-field communication (NFC) technology, an infrared (IR) technology, or the like. The wireless communication module 130 may be one or more components integrating at least one communication processing module. The wireless communication module 130 receives an electromagnetic wave through the antenna 2, performs frequency modulation and filtering processing on an electromagnetic wave signal, and transmits a processed signal to the processor 110. The wireless communication module 130 may further receive a to-be-transmitted signal from the processor 110, perform frequency modulation and amplification on the signal, and convert the signal into an electromagnetic wave for radiation through the antenna 2.

In some embodiments, the antenna 1 and the mobile communication module 120 in the electronic device 100 are coupled, and the antenna 2 and the wireless communication module 130 in the electronic device 100 are coupled, so that the electronic device 100 can communicate with a network and another device by using a wireless communication technology. The wireless communication technology may include a Global System for Mobile Communications (GSM), a General Packet Radio Service (GPRS), code-division multiple access (CDMA), wideband CDMA (WCDMA), time-division CDMA (TD-SCDMA), Long-Term Evolution (LTE), New Radio (NR), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

Figure 2:
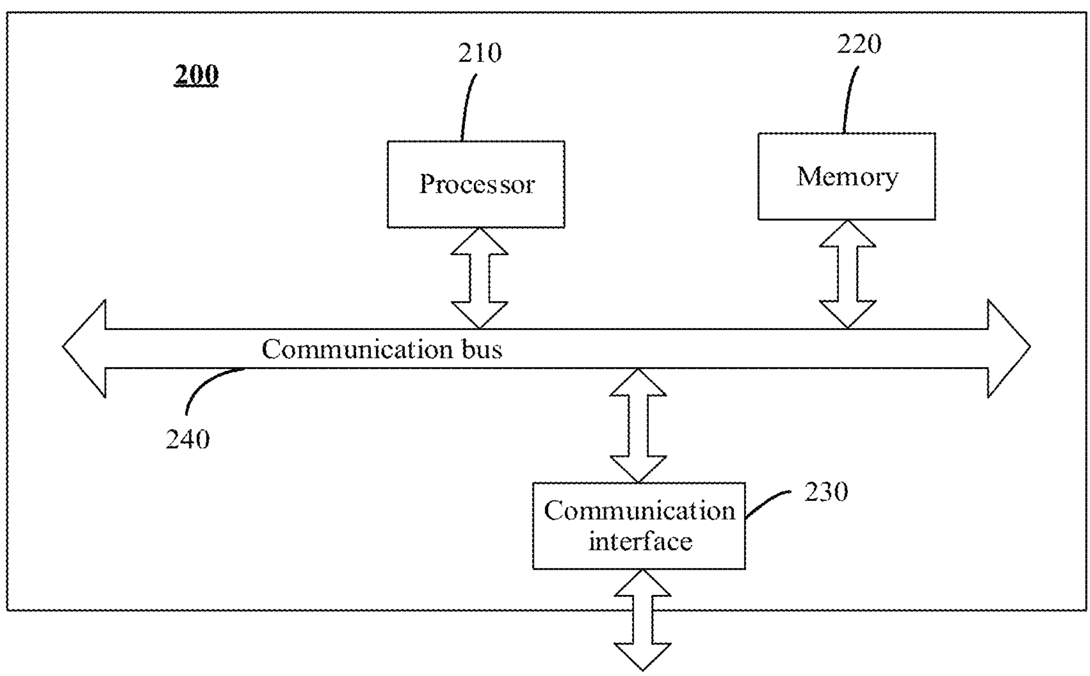
FIG. 2 is a schematic diagram of a hardware structure of a server according to an embodiment of this disclosure.

Next, an example of a server provided in the following embodiments of this disclosure is described with reference to FIG. 2. FIG. 2 is a schematic diagram of a structure of the server 200. The server 200 may include at least one processor, and at least one memory communicatively connected to the processor. The memory stores program instructions that can be executed by the processor, and the processor can invoke the program instructions to perform actions in the method provided in embodiments of this disclosure.

As shown in FIG. 2, the server 200 may be represented in a form of a general-purpose computing device. Components of the server 200 may include but are not limited to one or more processors 210, a memory 220, and a communication bus 240 and a communication interface 230 that are connected to different system components (including the memory 220 and the processor 210).

The communication bus 240 represents one or more of several types of bus structures, including a memory bus or a memory controller, a peripheral bus, a graphics acceleration port, a processor, or a local bus that uses any of a plurality of bus structures.

The memory 220 may include a computer system readable medium in a form of a volatile memory, for example, a random-access memory (RAM) and/or a cache memory.

A program/utility tool that includes a set (or at least one) of program modules may be stored in the memory 220. Such a program module includes, but is not limited to, an operating system, one or more applications, another program module, and program data. Each or a combination of these examples may include an implementation of a network environment. The program module usually performs a function and/or a method in embodiments described in this disclosure.

The server 200 may also communicate with one or more external devices (for example, a keyboard, a pointing device, and a display), may further communicate with one or more devices that enable a user to interact with the server 200, and/or communicate with any device (for example, a network interface card or a modem) that enables the server 200 to communicate with one or more other computing devices. Such communication may be implemented through the communication interface 230. In addition, the server 200 may further communicate with one or more networks (for example, a local area network (LAN), a wide area network (WAN), and/or a public network, such as the Internet) by using a network adapter (not shown in FIG. 2). The network adapter may communicate with another module of the electronic device through the communication bus 240. It should be understood that, although not shown in FIG. 2, other hardware and/or software modules, including but not limited to, microcode, a device drive, a redundant processing unit, an external disk drive array, a redundant arrays of independent drives (RAID) system, a tape drive, and a data backup storage system, may be used in combination with the server 200

Figures 3, 4:
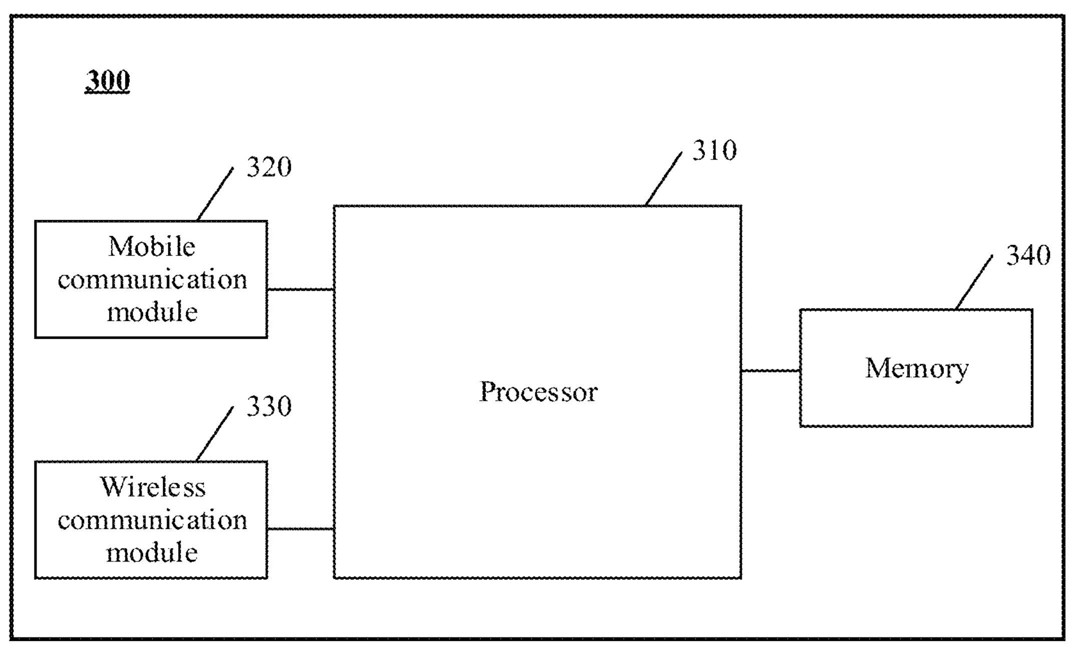
FIG. 3 is a schematic diagram of a hardware structure of a vehicle according to an embodiment of this disclosure.
FIG. 4 is a schematic diagram of an architecture of an application scenario according to an embodiment of this disclosure.

Next, an example of a vehicle provided in the following embodiments of this disclosure is described with reference to FIG. 3. FIG. 3 is a schematic diagram of a structure of the vehicle 300. The vehicle 300 may include at least one processor 310, a mobile communication module 320, a wireless communication module 330, and at least one memory 340 communicatively connected to the processor. The memory stores program instructions that can be executed by the processor, and the processor can invoke the program instructions to perform actions in the method provided in embodiments of this disclosure.

The memory 340 stores program instructions that can be executed by the processor 310, and the processor 310 can invoke the program instructions to perform actions in the method provided in embodiments of this disclosure.

The mobile communication module 320 may provide a wireless communication solution that is applied to the vehicle 300 and that includes 2G/3G/4G/5G. For a specific implementation of the mobile communication module 320, refer to the mobile communication module 120 in FIG. 1. Details are not described herein again. Communication between the electronic device 100 and the server 200 may be implemented through the mobile communication module 320. For example, the electronic device 100 may communicate with a base station through the mobile communication module 320, and access the Internet through the base station, to communicate with the server 200.

The wireless communication module 330 may provide a wireless communication solution that is applied to the electronic device 100 and that includes a WLAN (such as WI-FI), a BT, a GNSS, FM, NFC, and IR. For a specific implementation of the wireless communication module 330, refer to the wireless communication module 130 in FIG. 1. Details are not described herein again. Communication between the electronic device 100 and the vehicle 300 may be implemented through the wireless communication module 330. For example, the electronic device 100 may communicate with the vehicle 300 through the BT.

FIG. 4 is a schematic diagram of an architecture of an application scenario according to an embodiment of this disclosure. As shown in FIG. 4, the application scenario may include an electronic device 100, a server 200, and a vehicle 300. The electronic device 100 may be a terminal device such as a mobile phone or a tablet. An application may be installed in the electronic device. For example, the application may be a smart vehicle key application. The smart vehicle key application may be used to request a smart key server in the server 200 to generate, update, revoke, and authorize a smart vehicle key. The smart vehicle key is electronic key information used to control a vehicle. The smart vehicle key may be an electronic key used to unlock the vehicle or perform another vehicle control operation, and may establish a wireless channel such as a BLUETOOTH channel with a vehicle-mounted short-range controller in the vehicle 300, so that vehicle control instructions can be transmitted to the vehicle-mounted short-range controller. It may be understood that this embodiment of this disclosure merely shows an example of a BLUETOOTH wireless communication manner, but does not constitute a limitation on embodiments of this disclosure. In some embodiments, another wireless communication manner may alternatively be used.

The server 200 may be a single computer, or may be a computer cluster. A form of the server 200 is not specially limited in embodiments of this disclosure. The server 200 may include a smart key server. The smart key server may be configured to receive a request such as a smart vehicle key sent by an application (for example, the smart vehicle key application) in the electronic device 100, and complete operations such as generating, updating, revocation, and authorization of the smart vehicle key for a user. It may be understood that the smart key server may be further configured to receive the smart vehicle key sent by the vehicle-mounted short-range controller in the smart vehicle 300, and perform secure storage on the smart vehicle key by using a key management service (KMS) module. Optionally, the server 200 may further include a public key infrastructure (PKI) server, the PKI server may be configured to issue a certificate to the smart key server and the vehicle-mounted short-range controller, and the certificate may be used to establish a secure transmission channel at a transport layer security (TLS) layer, so that safe transmission of the smart vehicle key can be ensured.

The vehicle 300 may include the vehicle-mounted short-range controller. The vehicle-mounted short-range controller may be responsible for broadcasting a radio frequency signal such as BLUETOOTH of the vehicle 300 and authentication of a smart vehicle key. In addition, the vehicle-mounted short-range controller may further work with a passive entry passive start (PEPS) system and a body control module (BCM), to implement control of vehicle doors and windows. The smart vehicle key may be generated by a security module (SE), and may be stored by the security module, so that security protection of the smart vehicle key can be ensured.

In a possible implementation, the smart vehicle key is generated only in the vehicle 300. For example, the smart vehicle key may be generated by an OEM during vehicle assembly, or the smart vehicle key may be generated in a factory mode. After the smart vehicle key is generated in the vehicle 300, the smart vehicle key may be stored in, for example, a hardware security module (HSM) or an SE chip. A plaintext of the smart vehicle key is kept within the security module, so that the smart vehicle key cannot be obtained externally, and security of the smart vehicle key can be ensured. The electronic device 100 may store the smart vehicle key by using a TEE, and the smart vehicle key is kept within the TEE. The server 300 stores the smart vehicle key by using the KMS. By means of secure storage of the smart vehicle key by the foregoing three parties (such as the electronic device 100, the smart vehicle 200, and server 300), it may be finally implemented that the smart vehicle key cannot be obtained by an attacker at any time in terms of use, transmission, storage, and the like, and end-to-end security of the smart vehicle key can be ensured.

Optionally, the smart vehicle key may ensure confidentiality of a server end, a vehicle end, and a terminal through an encrypted channel. In addition, leakage of the smart vehicle key in the vehicle and the terminal is avoided, to ensure that the plaintext of the smart vehicle key is kept within the security module. The smart vehicle key may also be encrypted by using a public key in the security module, so that security of the smart vehicle key can be further improved.

Figure 5:
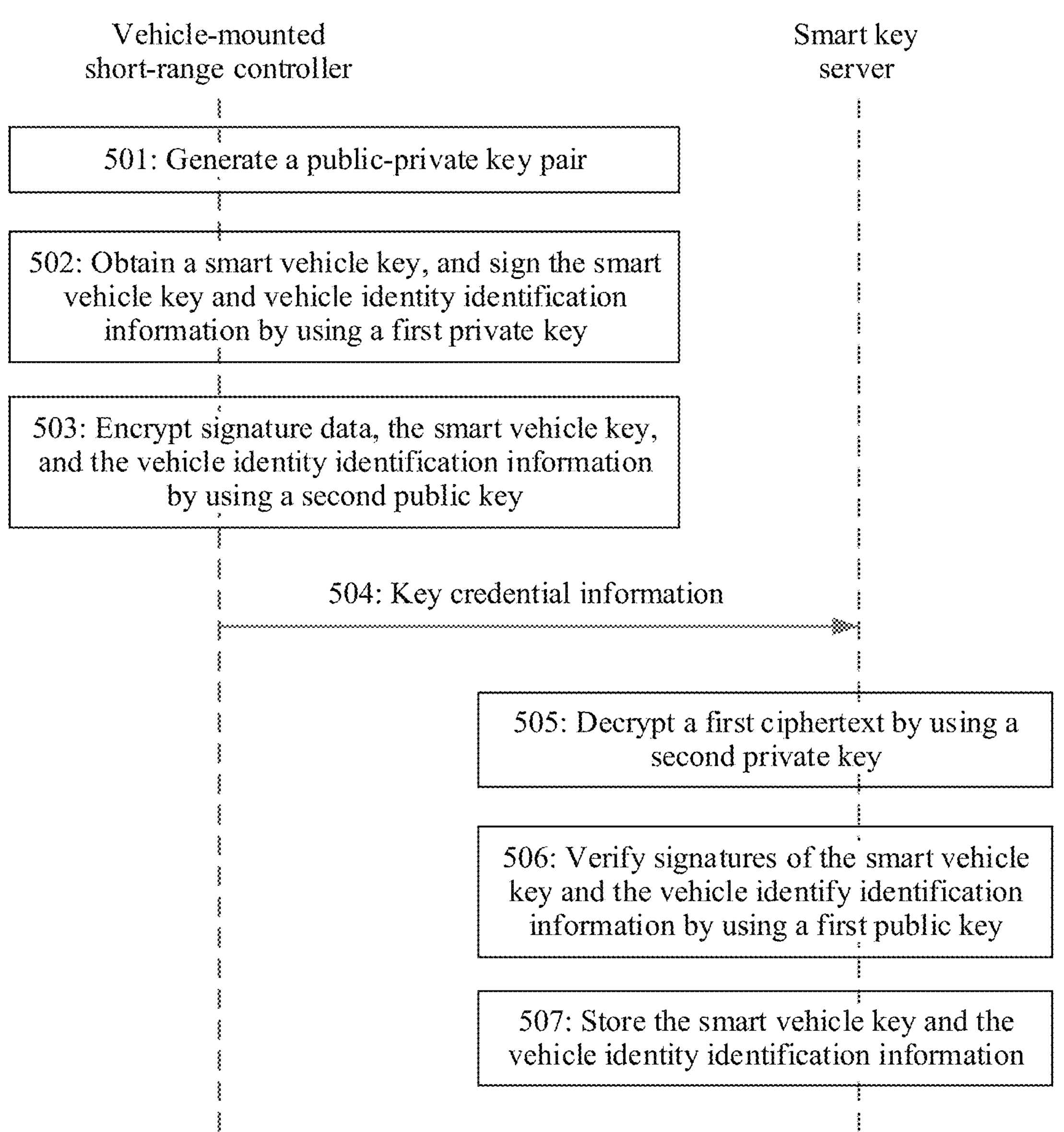
FIG. 5 is a schematic flowchart of an embodiment of a communication method according to this disclosure.

With reference to FIG. 5, a communication method provided in an embodiment of this disclosure is described.

FIG. 5 is a schematic flowchart of an embodiment of the communication method according to this disclosure. The communication method is applied to a vehicle 300, and includes the following steps.

Step 501: A vehicle-mounted short-range controller generates a public-private key pair.

Further, the vehicle-mounted short-range controller may generate the public-private key pair in a security module, and vehicle security can be greatly improved when the public-private key pair is generated in the security module. The public-private key pair generated in the vehicle-mounted short-range controller may be generated according to an asymmetric encryption algorithm. For example, the public-private key pair may include a public key and a private key. For ease of description, the public key generated in the vehicle-mounted short-range controller is referred to as a "first public key", and the private key generated in the vehicle-mounted short-range controller is referred to as a "first private key".

In order to further improve security and prevent another person from forging the public key, vehicle identity identification information and the first public key may be sent together to a third-party authority, for example, an authoritative certificate authority. The vehicle identity identification information may be information used to identify a vehicle identity. The vehicle identity identification information may be a vehicle identification number (VIN), and the VIN may also be referred to as a vehicle frame number. In a specific implementation, the vehicle identity identification information may alternatively be replaced by a license plate number or other information used to represent the vehicle identity. A specific form of the information used to identify the vehicle identity is not specially limited in embodiments of this disclosure. After verifying the vehicle identity identification information, the third-party authority may issue a digital certificate to a vehicle corresponding to the vehicle identity identification information. The digital certificate is obtained by the third-party authority through signing by using a private key of the third-party authority. The first certificate includes the vehicle identity identification information and the first public key, and is used to prove that a generator of the first public key is the vehicle corresponding to the vehicle identity identification information. After obtaining the digital certificate, the vehicle-mounted short-range controller may send the digital certificate to the smart key server. For ease of description, the digital certificate in the vehicle-mounted short-range controller may be referred to as a first certificate.

To prevent the first certificate from being forged, the vehicle-mounted short-range controller may further pre-store a root certificate. The root certificate may also be issued in advance by the third-party authority that issues the first certificate, and the root certificate includes a public key of the third-party authority and information about the third-party authority. Because the first certificate is signed by the third-party authority by using a private key, the first certificate may be verified by using the public key of the third-party authority in the root certificate, so that it can be ensured that the first certificate is sent by the third-party authority.

Step 502: The vehicle-mounted short-range controller obtains a smart vehicle key, and signs the smart vehicle key and the vehicle identity identification information by using the first private key.

In a possible implementation, the smart vehicle key may be generated by an OEM in a factory mode.

The vehicle-mounted short-range controller may sign the smart vehicle key and the vehicle identity identification information by using the first private key generated in step 501, to obtain signature data, where the signature data may include a signed smart vehicle key and signed vehicle identity identification information. The signed smart vehicle key is signature information obtained by signing the smart vehicle key, and the signed vehicle identity identification information is signature information obtained by signing the vehicle identity identification information. In a possible implementation, the signature data may be data obtained by signing a file that includes the smart vehicle key and the vehicle identity identification information.

In a possible implementation, a specific process of signing the smart vehicle key and the vehicle identity identification information by using the first private key may be calculating a hash value for the smart vehicle key and the vehicle identity identification information according to a hash algorithm, where the hash algorithm may be preset. For example, the hash algorithm may be any one of SHA-1, SHA-224, SHA-256, SHA-384, and SHA-512, or may be another type of hash algorithm. This is not specially limited in embodiments of this disclosure. Then, the hash value may be signed, to obtain the signature data.

Step 503: The vehicle-mounted short-range controller encrypts the signature data, the smart vehicle key, and the vehicle identity identification information by using a public key of the smart key server, to obtain a first ciphertext.

Further, the smart key server may also generate a public-private key pair, and the public-private key pair generated in the smart key server may also be generated according to an asymmetric encryption algorithm. It may be understood that the asymmetric encryption algorithm used by the vehicle-mounted short-range controller to generate the public-private key pair may be the same as or different from the asymmetric encryption algorithm used by the smart key server to generate the public-private key pair. The used asymmetric encryption algorithm is not specially limited in embodiments of this disclosure. For ease of description, a public key generated in the smart key server is referred to as a "second public key", and a private key generated in the smart key server is referred to as a "second private key".

Further, to prevent the second public key from being forged, the smart key server may alternatively apply for a digital certificate. For ease of description, the digital certificate in the server is referred to as a second certificate in this specification. The second certificate may include identity information of the smart key server and the second public key. For a specific manner of obtaining the second certificate, refer to the manner of obtaining the first certificate. Details are not described herein again. After the second certificate is obtained, the second certificate may be sent to the vehicle-mounted short-range controller, so that it can be verified that a generator of the second public key is the smart key server, and security can be improved.

To prevent the second certificate from being forged, the smart key server may alternatively pre-store a root certificate. For a manner of obtaining the root certificate of the smart key server, refer to a manner of obtaining the root certificate of the vehicle-mounted short-range controller. Details are not described herein again.

It should be noted that, after generating the second public key, the smart key server may send the second public key to the vehicle-mounted short-range controller. Similarly, after generating the first public key, the vehicle-mounted short-range controller may alternatively send the first public key to the smart key server.

Then, the vehicle-mounted short-range controller encrypts the signature data, the smart vehicle key, and the vehicle identity identification information by using the second public key, to obtain the first ciphertext. In a possible implementation, the first ciphertext may include encrypted signature data, an encrypted smart vehicle key, and encrypted vehicle identity identification information. In a possible implementation, the first ciphertext includes encrypted signature data, the smart vehicle key, and the vehicle identity identification information.

Step 504: The vehicle-mounted short-range controller sends key credential information to the smart key server. Correspondingly, the smart key server receives the key credential information.

Further, the vehicle-mounted short-range controller may send the key credential information to the smart key server, so that upload of the smart vehicle key to the server can be completed. The key credential information may be obtained by encrypting the smart vehicle key by using the smart vehicle key as a key. The key credential information may alternatively include the first ciphertext and the first public key. Because the smart vehicle key is signed and/or encrypted before the uploading process, security of the smart vehicle key and non-tampering of the transmitted encrypted signature data can be ensured Step 505: The smart key server decrypts the first ciphertext by using the second private key.

Further, after receiving the first ciphertext, the smart key server may decrypt the first ciphertext by using the second private key, to obtain the signature data, the smart vehicle key, and the vehicle identity identification information, where the signature data may include the signed smart vehicle key and the signed vehicle identity identification information.

Step 506: The smart key server verifies signatures of the smart vehicle key and the vehicle identity identification information by using the first public key.

Further, after obtaining the signature data, the smart key server may perform signature verification on the signature data by using the first public key. In other words, the signature verification may be used to verify whether the smart vehicle key and the vehicle identity identification information are generated by an owner of the first public key (or the first private key). If the signature verification succeeds, step 507 may be further performed. If the signature verification fails, the smart vehicle key and the vehicle identity identification information may be discarded, and this process may be ended.

A specific manner of performing signature verification by using the first public key may be performing a verification operation on the signature data by using the first public key, to obtain a first hash value. Then, a hash operation is performed based on the smart vehicle key and the vehicle identity identification information that are obtained through decryption in step 505, to obtain a second hash value. The first hash value is compared with the second hash value. If the first hash value is consistent with the second hash value, it may be determined that the signature verification succeeds. If the first hash value is inconsistent with the second hash value, it may be determined that the signature verification fails.

If the smart key server receives the first certificate sent by the vehicle-mounted short-range controller before receiving the encrypted signature data, the smart key server may further verify the first public key based on the first certificate, to ensure that the first public key is sent by the vehicle-mounted short-range controller. This can prevent others from forging the first public key, and can ensure that the smart vehicle key and the vehicle identity identification information are sent by the vehicle-mounted short-range controller, so that security can be improved.

To prevent the first certificate from being forged or tampered with, the smart key server may verify the first certificate by using the pre-stored root certificate. Because the first certificate is signed by the third-party authority by using the private key, the first certificate may be verified by using the root certificate, to ensure that the first certificate is not tampered with.

Step 507: The smart key server stores the smart vehicle key and the vehicle identity identification information.

Further, the smart key server may perform secure storage on the smart vehicle key and the vehicle identity identification information corresponding to the smart vehicle key by using a KMS. In other words, the smart vehicle key and the vehicle identity identification information may be bound and stored. In this way, the vehicle-mounted short-range controller can upload the smart vehicle key to the server. Because the second private key is owned only by the smart key server, the encrypted signature data obtained through encryption by using the second public key can be decrypted only by the smart key server, so that security of the encrypted smart vehicle key can be ensured. In addition, because the first private key is owned only by the vehicle-mounted short-range controller, signature verification is performed on the smart vehicle key by using the first public key, so that correctness of the signature of the smart vehicle key can be ensured.

It may be understood that the foregoing embodiment merely shows an example of a scenario in which the vehicle-mounted short-range controller uploads the smart vehicle key, but does not constitute a limitation on embodiments of this disclosure. The foregoing embodiment is also applicable to a scenario in which the smart vehicle key is updated. For example, the vehicle 300 may actively update the key credential information through the vehicle-mounted short-range controller, upload updated key credential information to the smart key server, and remind a user after the key credential information is updated. For example, the vehicle 300 may send a key update prompt to an electronic device of the user, to prompt the user to update the smart vehicle key. In a possible implementation, the vehicle 300 may alternatively passively update the key credential information through the vehicle-mounted short-range controller, and may upload updated key credential information to the smart key server. For example, the user may send a key update request to the vehicle 300 by using the electronic device, where the key update request may be used to request to generate a new smart vehicle key. The vehicle 300 may generate the new smart vehicle key based on the key update request, and may determine new key credential information based on the new smart vehicle key. Alternatively, the smart key server may request the vehicle 300 to update the key credential information. This ensures that a vehicle owner or another user can trigger the vehicle to update the smart vehicle key in time when the smart key is lost or leaked. Correspondingly, the smart key server may periodically receive the key credential information, to periodically update the key credential information. In addition, the smart key server may alternatively send a key update prompt to the electronic device of the user, to prompt the user to update the smart vehicle key.

In embodiments of this disclosure, the smart vehicle key is generated only on the vehicle, and is stored in the security module. Transmission outside the security module is encrypted transmission, and the smart vehicle key cannot be obtained externally, so that vehicle security can be ensured.

The generation and upload of the smart vehicle key are described above as an example with reference to FIG. 5. Next, a key distribution scenario provided in an embodiment of this disclosure is described with reference to FIG. 6.

Figure 6:
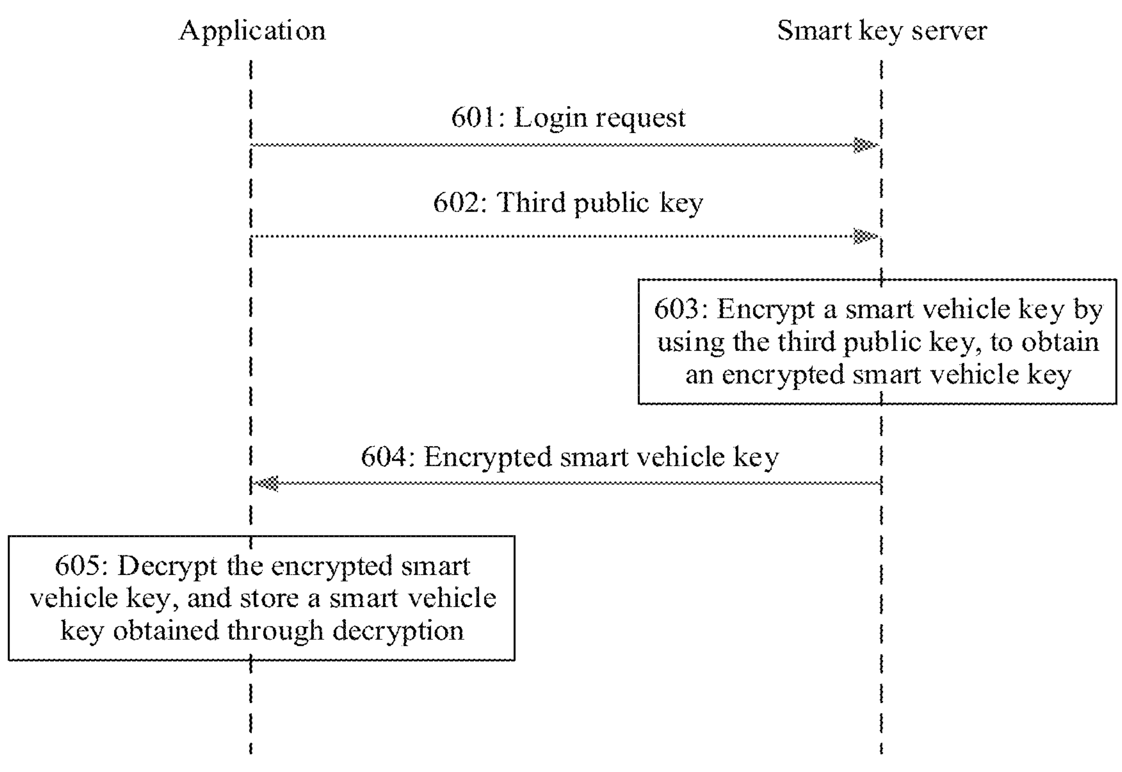
FIG. 6 is a schematic flowchart of another embodiment of a communication method according to this disclosure.

FIG. 6 is a schematic flowchart of another embodiment of a communication method according to this disclosure. The communication method includes the following steps.

Step 601: A user logs in to a smart key server.

Further, the user may log in to the smart key server by using a pre-registered account. The pre-registered account may be bound to vehicle identity identification information. For example, the user may pre-register an account in the smart key server by using an application (such as a smart vehicle key application), and the account may be bound to the vehicle identity identification information entered by the user. After the user is successfully registered, the smart key server allocates the registration account to the user in a system, and the registration account is bound to the vehicle identity identification information. It may be understood that the smart key server pre-stores, in the system, a smart vehicle key and the vehicle identity identification information corresponding to the smart vehicle key. Based on the account registered by the user, the smart key server may allocate, to the user, the smart vehicle key corresponding to the account.

Step 602: The application generates a public-private key pair, and sends a public key to the smart key server.

Further, the application may generate the public-private key pair in a TEE, and vehicle security can be improved when the public-private key pair is generated in the TEE. For ease of description, the public key generated by the application is referred to as a "third public key", and a private key generated by the application is referred to as a "third private key".

Then, the application may send the third public key to the smart key server.

Step 603: The smart key server obtains the smart vehicle key, and encrypts the smart vehicle key by using the third public key, to obtain an encrypted smart vehicle key.

Further, after the user logs in to the smart key server by using the account, the smart key server may obtain, based on the account logged in by the user, the vehicle identity identification information corresponding to the account, and obtain, based on the vehicle identity identification information, the smart vehicle key corresponding to the vehicle identity identification information.

Then, the smart key server may encrypt the smart vehicle key by using the third public key sent by the application, to obtain the encrypted smart vehicle key, where the encrypted smart vehicle key is an encrypted key obtained by encrypting the smart vehicle key.

Step 604: The smart key server sends the encrypted smart vehicle key to the application.

Step 605: The application decrypts the encrypted smart vehicle key, and stores a smart vehicle key obtained through decryption.

Further, after receiving the encrypted smart vehicle key sent by the smart key server, the application may decrypt the encrypted smart vehicle key in the TEE by using the third private key, to obtain the smart vehicle key.

Then, the application may store the smart vehicle key obtained through decryption in the TEE, and security can be improved when the smart vehicle key is stored in the TEE. Because the third private key is owned by only the application, only the application can decrypt the encrypted smart vehicle key obtained after being encrypted by using the third public key, so that security of the smart vehicle key in a distribution process can be ensured.

In some optional embodiments, the user may alternatively actively request the smart vehicle key. For example, the user may perform an operation on the application to send a key request to the smart key server, where the key request includes a user account, and the key request is used to obtain a smart vehicle key corresponding to the user account. After receiving the key request, the smart key server may send the encrypted smart vehicle key to the application.

In embodiments of this disclosure, secure storage is performed on the smart vehicle key in a security module of a terminal. Transmission outside the security module is encrypted transmission, and the smart vehicle key cannot be obtained externally, so that vehicle security can be ensured.

The foregoing describes the key distribution scenario by using FIG. 6. Next, the following describes a key use scenario and a key update scenario by using FIG. 7 and FIG. 8, respectively.

Figure 7:
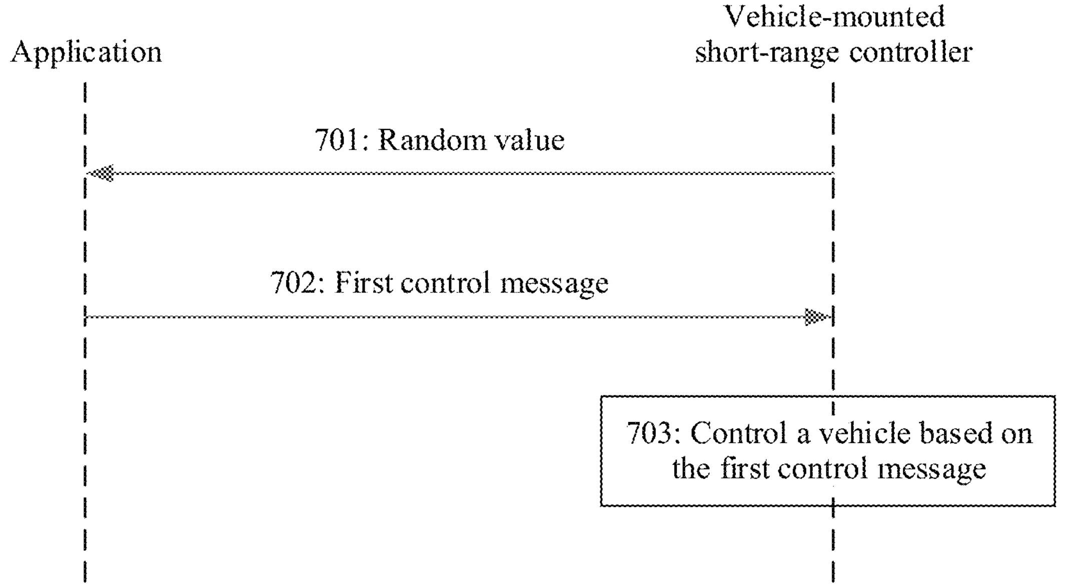
FIG. 7 is a schematic flowchart of still another embodiment of a communication method according to this disclosure.

FIG. 7 is a schematic flowchart of still another embodiment of a communication method according to this disclosure. The communication method further includes the following steps.

Step 701: A vehicle-mounted short-range controller sends a random value to an application.

Further, the vehicle-mounted short-range controller may send the random value to the application in advance. The random value may be a random number, or may be a string of random numbers. A form of the random value is not specially limited in embodiments of this disclosure.

Step 702: The application generates a first control message based on a smart vehicle key and the random value, and sends the first control message to the vehicle-mounted short-range controller.

Further, the first control message may be generated based on the smart vehicle key and the random value. For example, the application may generate the first control message based on the random value, the smart vehicle key, and a control instruction according to a symmetric encryption algorithm such as Password-Based Key Derivation Function 2 (PBKDF2) or Advanced Encryption Standard (AES) in a TEE. The control instruction may be used to control a smart vehicle. It may be understood that the foregoing algorithm such as PBKDF2 or AES is merely a preferred manner, and can ensure security, but does not constitute a limitation on embodiments of this disclosure. In some embodiments, another asymmetric encryption algorithm may alternatively be used.

For example, when the application uses the PBKDF2 algorithm in the TEE, the first control message may be generated based on the random value and the smart vehicle key.

When the application uses the AES algorithm, the first control message may be generated based on the random value, the smart vehicle key, and the control instruction. The control instruction may be an operation instruction such as opening a door or opening a window that is entered by a user.

A difference between using the AES algorithm and using the PBKDF2 algorithm lies in that the first control message generated by using the PBKDF2 algorithm may not carry a control instruction, and the first control message generated by using the AES algorithm may carry a control instruction.

Step 703: The vehicle-mounted short-range controller controls a vehicle based on the first control message.

Further, after receiving the first control message sent by the application, the vehicle-mounted short-range controller may verify the first control message. A verification manner may be as follows. The vehicle-mounted short-range controller may generate a control message (for example, a second control message) based on the random value and the smart vehicle key in step 701. It may be understood that the second control message is generated by using a symmetric encryption algorithm that is the same as that of the first control message. For example, if the first control message is generated by using the PBKDF2 algorithm, the second control message is also generated by using the PBKDF2 algorithm. In this case, neither the first control message nor the second control message includes a control instruction. If the first control message is generated by using the AES algorithm, the second control message is also generated by using the AES algorithm. In this case, both the first control message and the second control message may include a control instruction.

Then, the second control message may be compared with the first control message. If the second control message is completely consistent with the first control message, the verification succeeds, that is, the user successfully unlocks the vehicle 300. In this case, if the first control message further includes a control instruction, the vehicle-mounted short-range controller may encrypt the control instruction in the first control message by using a communication key comKey, and send an encrypted control instruction to a vehicle-mounted component such as a BCM, to control the vehicle 300. The communication key comKey may be a key used for communication inside the vehicle 300, and the communication key comKey may be used in a communication process after the user unlocks the vehicle 300.

In some optional embodiments, in a process of controlling the vehicle 300, the user may further update the smart vehicle key. For example, the user may send a key update request to the vehicle 300 through an application. The key update request is used to generate a new smart vehicle key, and the new smart vehicle key can thus be obtained from a smart key server. After the user successfully performs authentication on the vehicle 300 by using the new smart vehicle key, the old smart vehicle key may be deleted, so that storage resources of the vehicle 300 can be saved.

In embodiments of this disclosure, in a process of using the smart vehicle key, the smart vehicle key cannot be obtained externally, so that vehicle security can be ensured.

Figure 8:
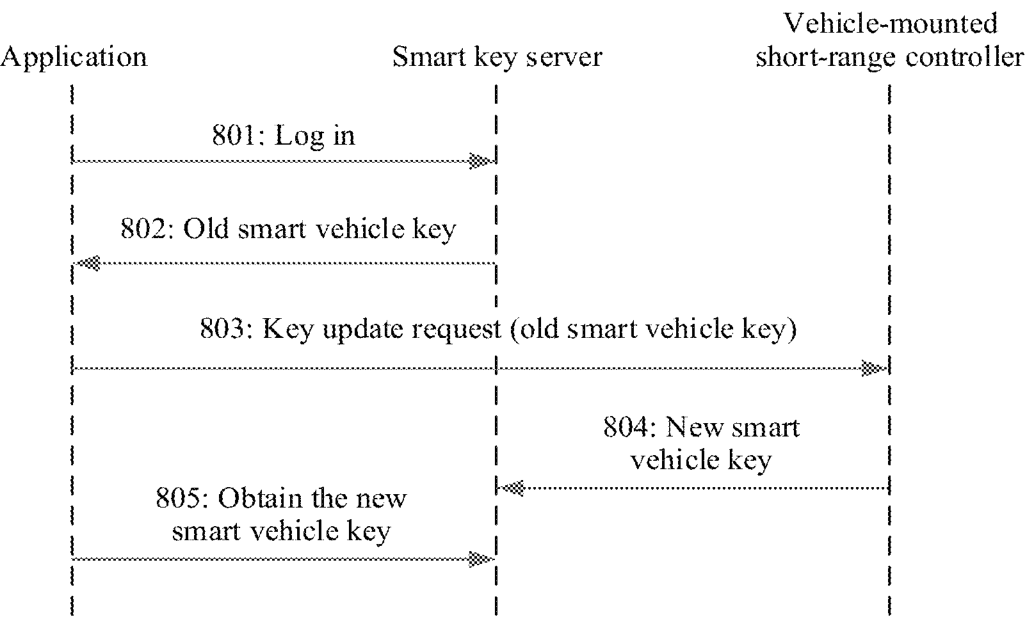
FIG. 8 is a schematic flowchart of still another embodiment of a communication method according to this disclosure.

FIG. 8 is a schematic flowchart of still another embodiment of a communication method according to this disclosure. The communication method further includes the following steps.

Step 801: A user logs in to a smart key server.

Further, the user may log in to the smart key server through an application in an electronic device 100 by using a pre-registered account. For a specific login process, refer to step 601. Details are not described herein again.

Step 802: The smart key server obtains the old smart vehicle key, and sends the old smart vehicle key to the application.

Further, the smart key server may find the corresponding old smart vehicle key based on the login account of the user. For a specific search process, refer to step 603. Details are not described herein again.

Then, the smart key server may send the old smart vehicle key to the application in a secure manner. For example, a third public key sent by the application may be used to encrypt the old smart vehicle key, so that an encrypted smart vehicle key may be obtained. The encrypted smart vehicle key may be sent to the application, so that secure transmission of the smart vehicle key can be ensured.

Step 803: The application sends a key update request to a vehicle-mounted short-range controller, to trigger the vehicle-mounted short-range controller to update a smart vehicle key.

Further, the user may actively request to update the smart vehicle key. For example, after the user loses or leaks the smart vehicle key, the smart vehicle key may be updated. In this case, the user may send the key update request to the vehicle-mounted short-range controller through the application, to trigger the vehicle-mounted short-range controller to update the smart vehicle key. The key update request may include the old smart vehicle key, that is, a smart vehicle key before the update. After receiving the key update request, the vehicle-mounted short-range controller may perform authentication on the old smart vehicle key. For a specific process of the authentication, refer to step 703. Details are not described herein again.

After the authentication succeeds, an update of the smart vehicle key may be triggered, so that a new smart vehicle key may be obtained. In specific implementation, a security module in the vehicle 300 may be triggered to generate the new smart vehicle key.

Step 804: The vehicle-mounted short-range controller uploads new key credential information to the smart key server.

Further, after obtaining the new smart vehicle key, the vehicle-mounted short-range controller may determine the new key credential information based on the new smart vehicle key, and may upload the new key credential information to the smart key server in a secure manner. Correspondingly, the smart key server may receive the new key credential information The vehicle-mounted short-range controller may send a credential update indication to the smart key server, where the credential update indication indicates to update the key credential information, and the credential update indication includes the new key credential information. The smart key server may update the key credential information based on the credential update indication.

In some optional embodiments, before the key credential information is updated based on the credential update indication, authentication may be further performed on the old smart vehicle key. If the authentication on the old smart vehicle key fails, the key credential information is not updated, so that security of the key credential information is ensured, and vehicle security can be ensured. If the authentication on the old smart vehicle key succeeds, the key credential information may be updated, and the old key credential information may be deleted after the successful update.

In some optional embodiments, after receiving the new smart vehicle key, the smart key server may further send a key update prompt to the electronic device of the user, where the key update prompt is used to prompt the user to update the smart vehicle key.

Step 805: The user downloads the new smart vehicle key from the smart key server.

Further, the user may log in to the smart key server again through the application, to obtain the new smart vehicle key. It may be understood that, in a process of obtaining the new smart vehicle key, the new smart vehicle key may alternatively be transmitted to the application in a secure manner.

Further, after obtaining the new smart vehicle key, the application may perform authentication by using the new smart vehicle key. After the authentication succeeds, the application, the smart key server and the vehicle-mounted short-range controller delete the old smart vehicle key, so that the update of the smart vehicle key can be completed.

In embodiments of this disclosure, when the smart vehicle key is lost or leaked, the smart vehicle key can be updated, so that vehicle security can be ensured.

The foregoing describes, by using FIG. 5 to FIG. 8, scenarios of uploading, distributing, using, and updating a key. The following describes a vehicle borrowing scenario by using FIG. 9 and FIG. 10. An embodiment shown in FIG. 9 is an application scenario in which a vehicle 300 is connected to the Internet, and an embodiment shown in FIG. 10 is an application scenario in which a vehicle 300 is not connected to the Internet.

Figure 9:
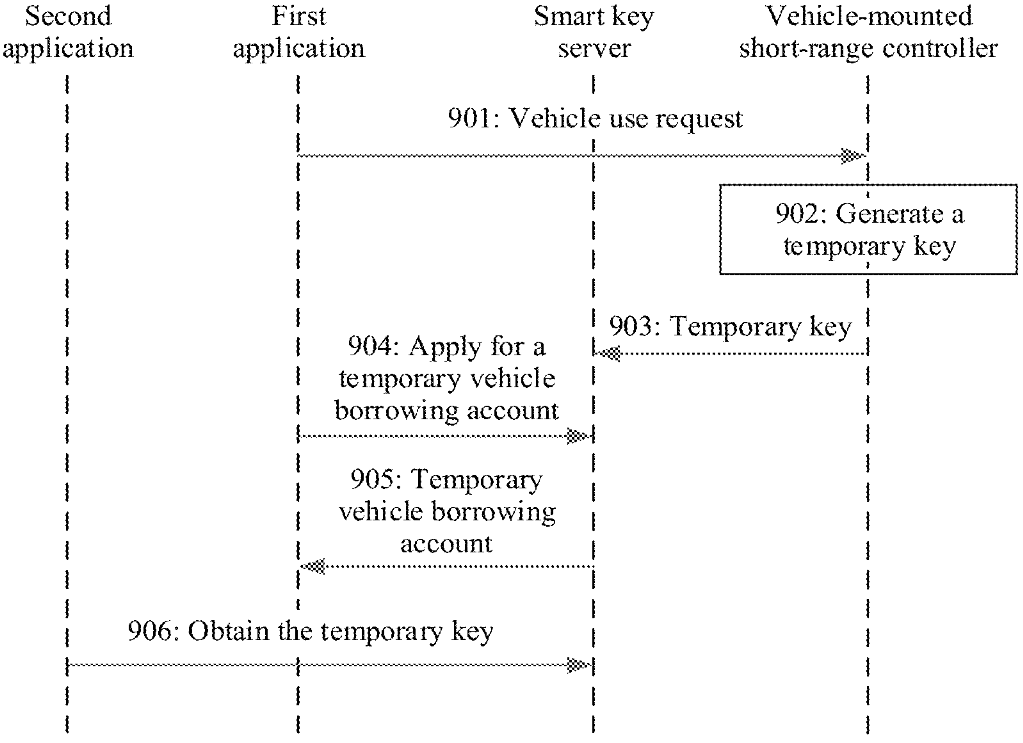
FIG. 9 is a schematic flowchart of still another embodiment of a communication method according to this disclosure.
Figure 10:
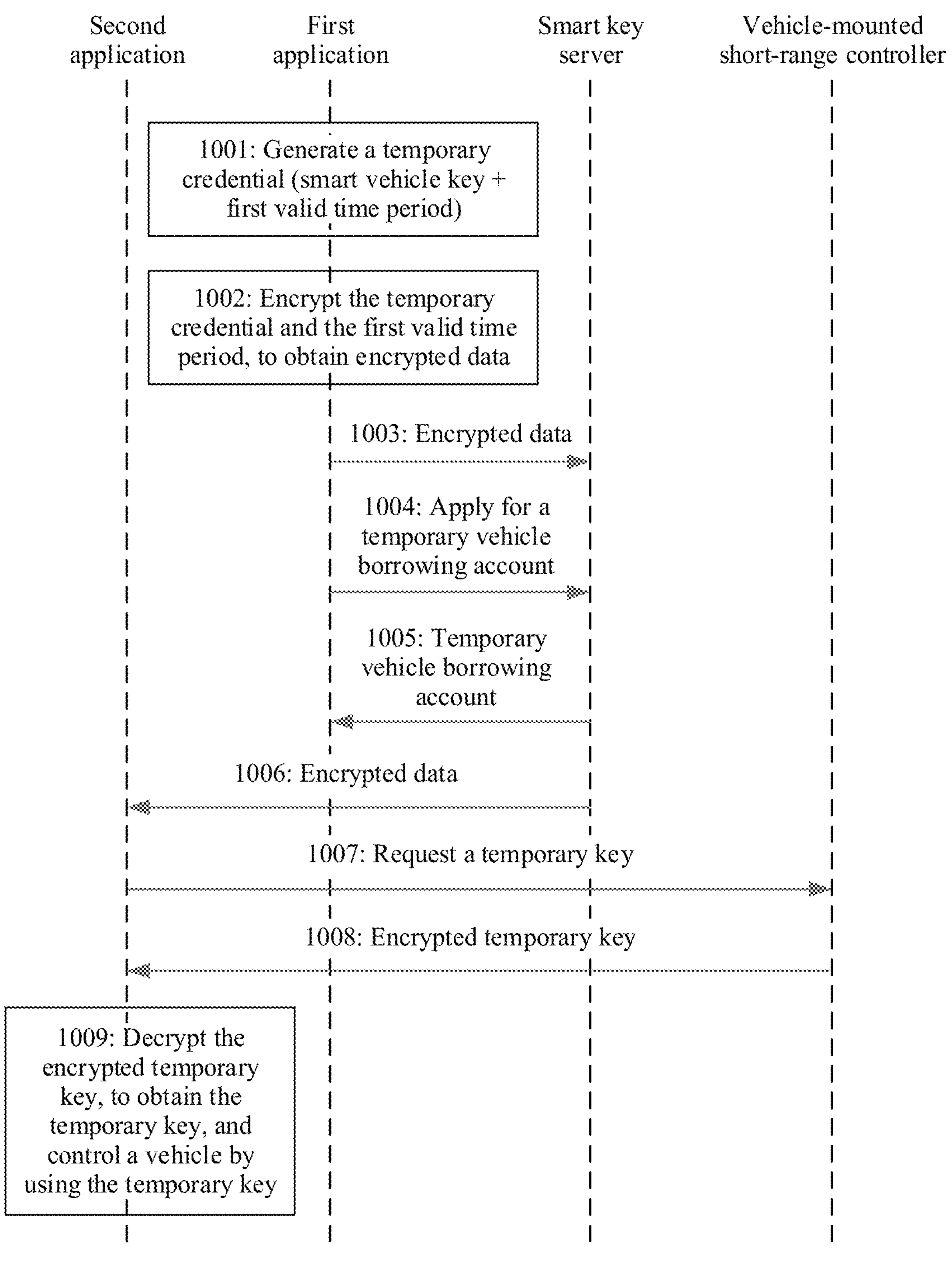
FIG. 10 is a schematic flowchart of still another embodiment of a communication method according to this disclosure.

FIG. 9 is a schematic flowchart of still another embodiment of a communication method according to this disclosure. The communication method includes the following steps.

Step 901: In response to a vehicle use operation of a first user, a first application sends a vehicle use request to a vehicle-mounted short-range controller.

Further, the first user may be a vehicle owner or a vehicle operator, and the first application may be an application installed on an electronic device 100 used by the first user. When a second user needs to borrow a vehicle from the first user, the first user may perform an operation on the first application on the electronic device 100 of the first user, to request to generate a temporary key. The second user may be a user who actually borrows the vehicle. The temporary key may be a temporary smart vehicle key having a valid time period. For example, the temporary smart vehicle key is valid in a specific time period, and if the time period expires, the temporary smart vehicle key becomes invalid.

In response to the vehicle use operation of the first user on the first application, the first application sends the vehicle use request to the vehicle-mounted short-range controller. The vehicle use request may include a smart vehicle key and a valid time period. For ease of description, the valid time period in the vehicle use request is referred to as a "first valid time period", and the first valid time period is used to represent a valid time period of the temporary key.

When sending the vehicle use request to the vehicle-mounted short-range controller, the first application may further encrypt the first valid time period, and an encrypted key may be the smart vehicle key. In other words, the first application may encrypt the first valid time period by using the smart vehicle key as a key, so that an encrypted first valid time period can be obtained. In this case, the vehicle use request may include the smart vehicle key and the encrypted first valid time period.

In some optional embodiments, the smart vehicle key in the vehicle use request may be a signed smart vehicle key, so that vehicle use security can be ensured. The signed smart vehicle key may be obtained by a third private key through signing the smart vehicle key.

In some optional embodiments, the vehicle use request may be sent by the electronic device used by the first user in a short-range communication manner. In some optional embodiments, the vehicle use request may alternatively be sent by the electronic device used by the first user through a mobile network.

In some optional embodiments, the vehicle use request may alternatively be sent by an electronic device used by the second user or a vehicle rental platform.

Step 902: The vehicle-mounted short-range controller generates the temporary key.

Further, the first application may perform authentication on the vehicle-mounted short-range controller by using the smart vehicle key. For a specific authentication manner, refer to the foregoing embodiments. Details are not described herein again.

It may be understood that, if the vehicle use request includes the signed smart vehicle key, before the authentication is performed on the vehicle-mounted short-range controller by using the smart vehicle key, signature verification may be further performed on the signed smart vehicle key. A manner of performing signature verification may be as follows: performing signature verification on the smart vehicle key based on a third public key, where the third public key is sent to the vehicle by the electronic device used by the first user.

After the authentication succeeds, the vehicle-mounted short-range controller may generate the temporary key based on the vehicle use request. In specific implementation, if the vehicle use request includes the first valid time period, a manner of generating the temporary key may be as follows. The vehicle-mounted short-range controller may use the first valid time period in the vehicle use request as a factor to generate the temporary key, and may perform secure storage on the first valid time period. For example, the first valid time period may be stored in a security module of the vehicle 300.

Optionally, if the vehicle use request includes the encrypted first valid time period, a manner of generating the temporary key may be as follows. The vehicle-mounted short-range controller may decrypt the encrypted first valid time period in a security module by using the smart vehicle key, to obtain the first valid time period. Then, the vehicle-mounted short-range controller may use the first valid time period as a factor to generate the temporary key, and may perform secure storage on the first valid time period. A specific manner of performing secure storage on the first valid time may be storing the first valid time in the security module of the vehicle. The security module has perfect information security protection measures, and can effectively ensure vehicle security.

Step 903: The vehicle-mounted short-range controller uploads the temporary key to a smart key server.

Further, the vehicle-mounted short-range controller may upload the temporary key to the smart key server in a secure manner. For a specific secure manner, refer to a manner of uploading the smart vehicle key to the smart key server. Details are not described herein again.

Step 904: The first user logs in to the smart key server, and applies for a temporary vehicle borrowing account.

Further, the first user may log in to the smart key server through the first application. The first user may log in to the smart key server by using a pre-registered user account, and the user account may be a permanent account, that is, the user account has no valid time period.

After successfully logging in to the smart key server by using the user account, the first user may send a temporary vehicle borrowing account registration request to the smart key server through the first application, to generate the temporary vehicle borrowing account. The temporary vehicle borrowing account registration request may include a valid time period. For ease of description, the valid time period in the temporary vehicle borrowing account registration request is referred to as a "second valid time period", and the second valid time period is used to represent a valid time period of the temporary vehicle borrowing account. It may be understood that the second valid time period may be the same as or different from the first valid time period. The second valid time period is less than or equal to the first valid time period.

Step 905: The smart key server generates the temporary vehicle borrowing account, and sends the temporary vehicle borrowing account to the first application.

Further, after receiving the temporary vehicle borrowing account registration request sent by the first application, the smart key server may generate the temporary vehicle borrowing account. It may be understood that the temporary vehicle borrowing account has a valid time period, and the valid time period of the temporary vehicle borrowing account may be determined based on the second valid time period in the temporary vehicle borrowing account registration request.

Then, the smart key server may further bind the temporary vehicle borrowing account to the temporary key, so that the second user (for example, a borrower) may log in to the smart key server within the second valid time period to obtain the temporary key, and may use the temporary key within the second valid time period. It may be understood that, when the second valid time period expires, the temporary vehicle borrowing account becomes invalid. In this case, the smart key server may delete the temporary vehicle borrowing account. In other words, the second user cannot log in to the smart key server again by using the temporary vehicle borrowing account to obtain the temporary key, so that convenience and security of vehicle borrowing can be improved.

Step 906: The second user logs in to the smart key server, obtains the temporary key, and starts the vehicle 300 by using the temporary key.

Further, the first user may hand over the temporary vehicle borrowing account to the second user. In this case, the second user may log in to the smart key server by using the temporary vehicle borrowing account through a second application, and initiate a temporary key request to the smart key server, to obtain the temporary key corresponding to the temporary vehicle borrowing account. The second application may be an application installed on the electronic device 100 used by the second user.

After obtaining the temporary key, the second user may perform authentication on the vehicle-mounted short-range controller by using the temporary key, to initiate an operation request to the vehicle 300. For a specific process of the authentication, refer to the authentication process of the smart vehicle key in the foregoing embodiments. Details are not described herein again.

After the vehicle-mounted short-range controller performs authentication on the temporary key, time validity may be further verified, that is, whether a current vehicle borrower is within a valid time period of vehicle borrowing may be verified. In specific implementation, the vehicle-mounted short-range controller may obtain a current system time, and may determine whether the current system time is within the first valid time period.

If the current system time is within the first valid time period, the second user may normally use the current vehicle. Therefore, the current vehicle can be successfully unlocked, and the second user may further deliver an instruction to operate the current vehicle.

If the current system time is not within the first valid time period, the second user does not have a right to use the current vehicle. Therefore, the current vehicle may continue to be locked, so that vehicle security can be ensured.

FIG. 10 is a schematic flowchart of another embodiment of a communication method according to this disclosure. The communication method includes the following steps.

Step 1001: A first application generates a temporary credential in response to a vehicle use operation of a first user.

Further, the first user may perform the vehicle use operation on the first application, and in response to the vehicle use operation of the first user, the first application may generate the temporary credential. The temporary credential may include a smart vehicle key and a first valid time period.

It may be understood that the foregoing manner of generating the temporary credential may be using any function, for example, temporary credential=func(smart vehicle key, first valid time period), where func( ) is a function. Alternatively, the temporary credential may be generated in another manner. A manner of generating the temporary credential is not specially limited in embodiments of this disclosure.

Step 1002: The first application encrypts the temporary credential and the first valid time period, to obtain encrypted data.

Further, the first application may encrypt the temporary credential and the first valid time period by using a key, to obtain the encrypted data. The first user has the smart vehicle key. In other words, an electronic device 100 of the first user has the smart vehicle key. The key may be the smart vehicle key, and the first application may encrypt the temporary credential and the first valid time period by using the smart vehicle key as a key. There is no need to perform key agreement with a vehicle-mounted short-range controller, so that communication efficiency can be improved. However, this does not constitute a limitation on embodiments of this disclosure. In some embodiments, the key may be another key, and the first application may alternatively encrypt the temporary credential and the first valid time period by using the other key. The other key may be obtained through key agreement between the first application and the vehicle-mounted short-range controller.

It should be noted that, when the temporary credential and the first valid time period are encrypted, the temporary credential and the first valid time period may be separately encrypted, so that two pieces of encrypted data may be obtained, for example, an encrypted temporary credential and an encrypted first valid time period. Alternatively, packaged data of the temporary credential and the first valid time period may be encrypted, to obtain one piece of encrypted data. The encryption manner is not specially limited in embodiments of this disclosure.

Step 1003: The first application uploads the encrypted data to a smart key server.

Step 1004: The first user logs in to the smart key server, and applies for a temporary vehicle borrowing account.

Further, the first user may log in to the smart key server through the first application.

After successfully logging in to the smart key server by using a user account, the first user may send a temporary vehicle borrowing account registration request to the smart key server through the first application, to generate the temporary vehicle borrowing account. The temporary vehicle borrowing account may be bound to the encrypted data.

Step 1005: The smart key server generates the temporary vehicle borrowing account, and sends the temporary vehicle borrowing account to the first application.

Further, after receiving the temporary vehicle borrowing account registration request sent by the first application, the smart key server may generate the temporary vehicle borrowing account, and may bind the temporary vehicle borrowing account to the encrypted data sent by the first application.

Then, the smart key server may send the temporary vehicle borrowing account to the first application.

Step 1006: A second application obtains the encrypted data.

Further, the second application may obtain the encrypted data in the following two manners.

Manner 1:

The first user may hand over the temporary vehicle borrowing account to a second user. In this case, the second user may log in to the smart key server by using the temporary vehicle borrowing account through the second application, to obtain the encrypted data corresponding to the temporary vehicle borrowing account.

Manner 2:

The first user may directly send the encrypted data to the second application. It may be understood that in Manner 2, step 1003 to step 1005 are optional steps.

Step 1007: The second application sends the encrypted data to the vehicle-mounted short-range controller, to request a temporary key.

Further, the second user may perform a temporary key request operation on the second application, and in response to the detected temporary key request operation of the second user, the second application may send the encrypted data to the vehicle-mounted short-range controller.

Step 1008: The vehicle-mounted short-range controller performs authentication on the encrypted data, to generate the temporary key, and sends the temporary key to the second application.

Further, after receiving the encrypted data sent by the second application, the vehicle-mounted short-range controller may perform authentication on the encrypted data. A specific process of the authentication may be as follows. The vehicle-mounted short-range controller may decrypt the encrypted data by using the smart vehicle key or a key negotiated in advance by vehicle-mounted short-range controller and the second application, to obtain decrypted data, that is, the temporary credential and the first valid time period. Next, the vehicle-mounted short-range controller may verify validity of the temporary credential and the first valid time period.

A manner of verifying validity of the temporary credential may be obtaining a temporary credential through calculation on the smart vehicle key and the first valid time period in a same manner (for example, a same function) in step 1001 at the vehicle-mounted short-range controller end. Then, the temporary credential obtained through calculation at the vehicle-mounted short-range controller end is compared with the temporary credential obtained through calculation in the first application. If the two temporary credentials are consistent, it may be determined that the temporary credential is valid. Alternatively, if the two temporary credentials are inconsistent, it may be determined that the temporary credential is invalid.

A manner of verifying validity of the first valid time period may be obtaining a moment of a current system, and comparing the moment of the current system with the first valid time period. If the moment of the current system is within the first valid time period, the first valid time period is valid. Alternatively, if the moment of the current system is not within the first valid time period, the first valid time period is invalid.

After the vehicle-mounted short-range controller determines that the temporary credential and the first valid time period are valid through verification, the vehicle-mounted short-range controller may generate the temporary key, and may encrypt the temporary key by using the temporary credential as a key, to obtain an encrypted temporary key.

Then, the vehicle-mounted short-range controller may send the encrypted temporary key to the second application, and may perform secure storage on the first valid time period. The method for performing secure storage on the first valid time period is described above, so that vehicle security can be improved, and external obtaining or tampering of the valid time period can be avoided.

In some optional embodiments, after the temporary key is generated, a time validity check may be further performed on the first valid time period. If it is detected that a current system time exceeds the first valid time period, that is, the time validity check fails, the temporary key may be set to invalid, and the user may be prompted that the temporary key is expired.

Step 1009: The second application decrypts the encrypted temporary key, and controls a vehicle by using the temporary key.

Further, after receiving the encrypted temporary key sent by the vehicle-mounted short-range controller, the second application may decrypt the encrypted temporary key based on the temporary credential, to obtain the temporary key.

Then, the second user may control the vehicle by using the temporary key. For example, the second user may send a control request to the vehicle-mounted short-range controller through the second application, where the control request includes the temporary key.

In some optional embodiments, the second user may alternatively encrypt the temporary key through the second application by using a first key, to obtain an encrypted temporary key, and may carry the encrypted temporary key in the operation request. Correspondingly, a vehicle 300 may decrypt the encrypted temporary key by using a first private key, to obtain the temporary key, so that security of the vehicle 300 can be improved and theft of the temporary key in a transmission process can be avoided.

In some optional embodiments, an electronic device of the second user may further send a fourth public key to the vehicle 300, and the vehicle 300 may verify the fourth key based on a fourth certificate. The fourth certificate may be sent by the electronic device of the second user to the vehicle 300 in advance. The fourth key is used to encrypt information sent by the vehicle 300 to the electronic device of the second user.

It may be understood that after the second application successfully decrypts the encrypted temporary key or the second user successfully unlocks the vehicle by using the temporary key, the encrypted data becomes invalid. In this case, the second application may store the temporary key in a TEE, so that security of the temporary key can be ensured. If the current system time exceeds the first valid time period, both the second application and the temporary key in the vehicle-mounted short-range controller become invalid.

In some optional embodiments, after the temporary key becomes invalid, a key invalidation notification may be further sent to the electronic device of the second user. The key invalidation notification indicates that the temporary key is invalid, so that a misoperation performed by the user in a case in which the temporary key is invalid can be avoided, and user experience can be improved.

In embodiments of this disclosure, in a vehicle borrowing scenario, both an application scenario in which a vehicle has a networking capability and an application scenario in which a vehicle does not have a networking capability may be supported. In a scenario in which the vehicle cannot be connected to a network, a vehicle owner may distribute the temporary credential to a borrower instead of distributing the smart vehicle key to the borrower, and the borrower exchanges the temporary key on the vehicle through the temporary credential, so that it can be ensured that only the borrower can get the temporary key, disorderly spread of the smart vehicle key to others can be avoided, and vehicle security can be ensured.

Figure 11:
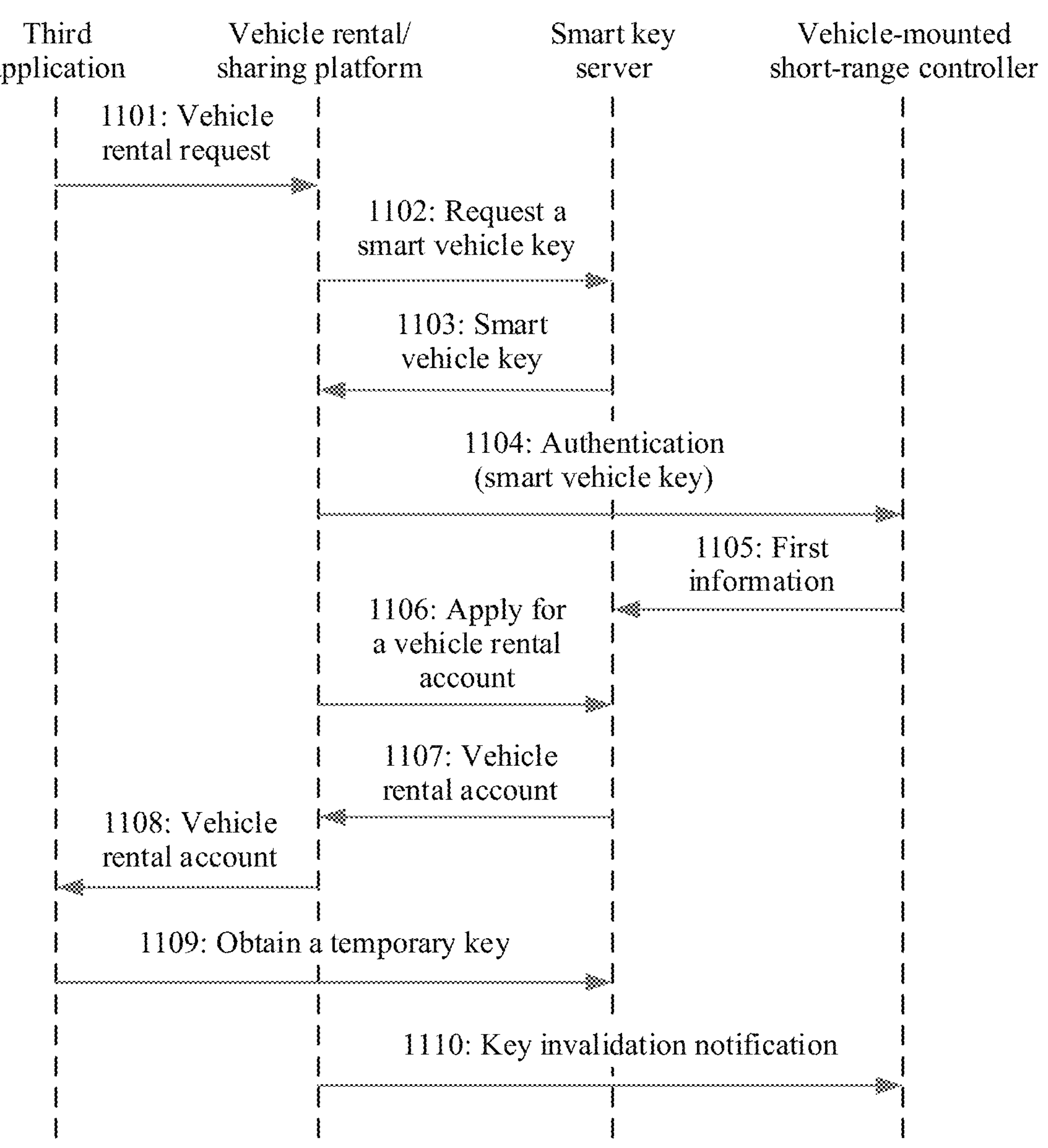
FIG. 11 is a schematic flowchart of still another embodiment of a communication method according to this disclosure.

Then, the following further describes a vehicle rental scenario by using FIG. 11. It should be noted that in the vehicle rental scenario, a smart key server and a vehicle rental/sharing platform may be a same server, or may be different servers. In the embodiment shown in FIG. 11, an example in which the smart key server and the vehicle rental/sharing platform are different servers is merely used for description, but this does not constitute a limitation on embodiments of this disclosure.

FIG. 11 is a schematic flowchart of an embodiment of a vehicle rental method according to this disclosure. The vehicle rental method includes the following steps.

Step 1101: A second user sends a vehicle rental request to a vehicle rental/sharing platform.

Further, the second user may also be a renter. When the second user needs to rent a vehicle, the second user may enter a vehicle rental time period in an application of an electronic device 100 of the second user, to send the vehicle rental request to the vehicle rental/sharing platform. In a possible implementation, the second user may enter, in a second application of the electronic device 100 of the second user, a vehicle rental time period and a rented vehicle model. In a possible implementation, the second user may enter information such as a vehicle rental time period, a rented vehicle model, and a vehicle rental location in the application. In a possible implementation, the vehicle rental request may further include vehicle identity identification information and a vehicle rental time period.

Step 1102: The vehicle rental/sharing platform requests a smart vehicle key from a smart key server.

Further, after receiving the vehicle rental request sent by the second application, the vehicle rental/sharing platform may obtain a qualified vehicle based on the vehicle rental request, and obtain vehicle identity identification information of the qualified vehicle. For example, an idle and appropriate vehicle is selected based on at least one of the vehicle rental time period, rented vehicle type information, vehicle rental location information, and the vehicle identity identification information that are entered by the user. After the vehicle is selected, the vehicle rental/sharing platform may send a key request to the smart key server based on the vehicle identity identification information of the vehicle, where the key request may be used to request to obtain the smart vehicle key. In a possible implementation, the key request may include the vehicle identity identification information, and is used to request to obtain a smart vehicle key of a specific vehicle.

TLS communication may be established between the vehicle rental/sharing platform and the smart key server, and two-way authentication can be performed through a certificate. For example, the vehicle rental/sharing platform may issue a certificate of the vehicle rental/sharing platform to the smart key server, and the smart key server may also issue a certificate of the smart key server to the vehicle rental/sharing platform. The vehicle rental/sharing platform and the smart key serve may separately perform encrypted transmission by using a public key of the smart key serve and the vehicle rental/sharing platform, and may separately decrypt received encrypted information by using a private key of the vehicle rental/sharing platform and the smart key serve. Details are not described herein again. Through the TLS communication between the vehicle rental/sharing platform and the smart key server, security of an entire system can be improved and vehicle security can be ensured.

Step 1103: The smart key server distributes the smart vehicle key to the vehicle rental/sharing platform.

Further, after receiving the key request of the vehicle rental/sharing platform, the smart key server may obtain, by querying based on the vehicle identity identification information in the key request, the smart vehicle key corresponding to the vehicle identity identification information, and may distribute the smart vehicle key to the vehicle rental/sharing platform.

Step 1104: The vehicle rental/sharing platform performs authentication on a vehicle-mounted short-range controller by using the smart vehicle key, and sends the vehicle rental time period to the vehicle-mounted short-range controller.

Further, after receiving the smart vehicle key distributed by the smart key server, the vehicle rental/sharing platform may perform authentication on the vehicle-mounted short-range controller by using the smart vehicle key. An authentication process is as described above.

In addition, the vehicle rental/sharing platform may also send the vehicle rental time period to the vehicle-mounted short-range controller. It may be understood that the vehicle rental time period and the smart vehicle key may alternatively be sent to the vehicle-mounted short-range controller simultaneously, or may be separately sent to the vehicle-mounted short-range controller. A sending moment of the vehicle rental time period is not specially limited in embodiments of this disclosure.

The vehicle rental/sharing platform may further send an encrypted vehicle rental time period to the vehicle-mounted short-range controller, so that security of the vehicle rental time period can be ensured. In specific implementation, the vehicle rental time period may be encrypted by using the smart vehicle key as a key.

After obtaining the encrypted vehicle rental time period, the vehicle may decrypt and obtain the vehicle rental time period. In a possible implementation, the vehicle (or the short-range controller of the vehicle) may perform decryption by using the smart vehicle key as a key. Efficiency and security can be improved when encryption or decryption is performed by using the smart vehicle key.

After obtaining the vehicle rental time period, the vehicle may perform secure storage on the vehicle rental time period. For example, the vehicle may store the vehicle rental time period in a security module, so that vehicle security can be improved, and the vehicle rental time period can be prevented from being tampered with or illegally obtained.

Step 1105: The vehicle-mounted short-range controller generates first information, and uploads the first information to the smart key server.

Further, after the vehicle-mounted short-range controller successfully performs authentication on the smart vehicle key sent by the vehicle rental/sharing platform, the first information may be generated. The first information may be a temporary key, and the temporary key is used to unlock and operate the vehicle 300. Alternatively, the first information may be encrypted data. The encrypted data may be obtained by encrypting a temporary credential and a first valid time period by using a smart vehicle key. The first valid time period may be a vehicle rental time period. The temporary key may be bound to the vehicle rental time period. In other words, the temporary key is valid within the vehicle rental time period, and the temporary key is invalid beyond the vehicle rental time period. In specific implementation, the temporary key may be generated in the following two manners.

Manner 1:

If the vehicle-mounted short-range controller receives the vehicle rental time period sent by the vehicle rental/sharing platform, the temporary key may be directly generated, and the temporary key may be bound to the vehicle rental time period.

Manner 2:

If the vehicle-mounted short-range controller receives the encrypted vehicle rental time period sent by the vehicle rental/sharing platform, the smart vehicle key may be used as a key to decrypt the encrypted vehicle rental time period, so that the vehicle rental time period may be obtained. Then, the vehicle-mounted short-range controller may generate the temporary key. In a possible implementation, the temporary key may be bound to the vehicle rental time period.

It should be noted that, after generating the first information, the vehicle-mounted short-range controller may further upload the first information to the smart key server, and may perform secure storage on the vehicle rental time period. The vehicle-mounted short-range controller may generate the temporary key in the security module, and vehicle security can be improved by generating the temporary key in the security module.

In some optional embodiments, an electronic device of the first user may alternatively upload the first information (for example, the encrypted data) to the smart key server.

Step 1106: The vehicle rental/sharing platform applies to the smart key server for a vehicle rental account.

Step 1107: The smart key server allocates the vehicle rental account to the vehicle rental/sharing platform, binds the vehicle rental account to the temporary key, and sends the vehicle rental account to the vehicle rental/sharing platform.

Step 1108: The vehicle rental/sharing platform sends the vehicle rental account to a second user.

Step 1109: The second user logs in to the smart key server, and obtains the temporary key.

Further, the second user may log in to the smart key server by using the vehicle rental account on the second application, and may obtain, from the smart key server, the temporary key corresponding to the vehicle rental account.

In some optional embodiments, the smart key server may encrypt the temporary key by using a fourth public key and send an encrypted temporary key to the electronic device of the second user, where the fourth public key may be sent by the electronic device of the second user to the smart key server.

Step 1110: The vehicle rental/sharing platform sends a key invalidation notification to the vehicle-mounted short-range controller.

Further, when the vehicle rental/sharing platform wants to terminate rental of the vehicle, the key invalidation notification may be sent to the vehicle-mounted short-range controller, where the key invalidation notification may be used to notify that a temporary vehicle rental key is invalid. In other words, regardless of whether the temporary vehicle rental key is within the valid time period of the vehicle rental time period at a current moment, after receiving the key invalidation notification, the vehicle-mounted short-range controller may set the temporary vehicle rental key to an invalid state, to terminate the rental of the vehicle. The renter cannot use the temporary vehicle rental key to start the vehicle. This provides more flexible access control for the vehicle rental/sharing platform and facilitates the vehicle rental/sharing platform to control a valid time period of the vehicle.

In some optional embodiments, the key invalidation notification may be further sent to the electronic device of the second user. The key invalidation notification indicates that the temporary key is invalid.

In embodiments of this disclosure, only the renter can use the temporary vehicle rental key within the vehicle rental time period, and another person cannot obtain the temporary vehicle rental key, so that vehicle use security can be ensured. In addition, the vehicle rental/sharing platform may terminate the use of temporary vehicle rental key at any time, to enable rental termination at any time and improve rental convenience.

In embodiments shown in FIG. 5 to FIG. 11, the smart key server is configured to store the smart vehicle key. In a possible implementation, the smart vehicle key may not be stored in the smart key server, but only an authentication credential is stored. The smart vehicle key may be exchanged by using the authentication credential. In this scenario, the smart vehicle key is stored only in the electronic device 100 and the vehicle 300, and transmission of the smart vehicle key occurs only between the electronic device 100 and the vehicle 300. Therefore, an attack surface of transmission and exposure of the smart vehicle key can be reduced, and security can be improved.

The embodiment shown in FIG. 5 is used as an example. After generating the smart vehicle key, the vehicle-mounted short-range controller does not upload the smart vehicle key to the smart key server, but generates an authentication credential by using the smart vehicle key, and may upload the authentication credential to the smart key server. After obtaining the authentication credential, the user cannot directly use the authentication credential as the smart vehicle key, but needs to use the authentication credential to exchange the smart vehicle key with the vehicle-mounted short-range controller. For a function of the authentication credential and a manner of exchanging the smart vehicle key by using the authentication credential, refer to a function of the temporary credential and a manner of exchanging the smart vehicle key by using the temporary credential in the embodiment shown in FIG. 10. Details are not described herein again.

Further, in a vehicle borrowing scenario in which a vehicle cannot be connected to a network in embodiments of this disclosure, the vehicle-mounted short-range controller may alternatively send a temporary credential having a valid time period to the smart key server, and the second user may exchange, in the vehicle-mounted short-range controller based on the temporary credential, a smart vehicle key having a valid time period.

In addition, in a vehicle rental scenario in embodiments of this disclosure, the vehicle-mounted short-range controller may alternatively send an authentication credential to the smart key server, and the vehicle rental/sharing platform may obtain a smart vehicle key based on the authentication credential. The vehicle rental/sharing platform may send a vehicle rental time period to the vehicle-mounted short-range controller. The vehicle-mounted short-range controller generates a temporary credential corresponding to the vehicle rental time period, and sends the temporary credential to the smart key server. The second user may obtain the temporary credential from the smart key server, and use the temporary credential to exchange for the temporary key corresponding to the vehicle rental time period at the vehicle-mounted short-range controller.

Figure 12:
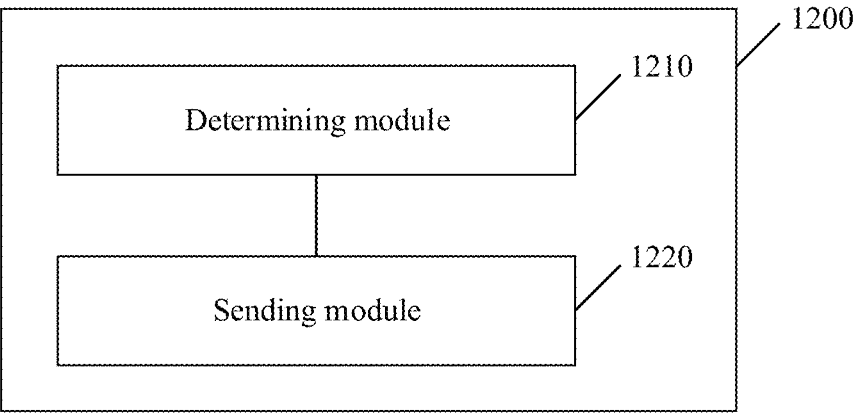
FIG. 12 is a schematic diagram of a structure of an embodiment of a communication apparatus according to this disclosure.

FIG. 12 is a schematic diagram of a structure of an embodiment of a communication apparatus according to this disclosure. As shown in FIG. 12, the communication apparatus 1200 is applied to a vehicle, the vehicle includes a smart vehicle key, and the smart vehicle key is electronic key information used to control the vehicle. The communication apparatus 1200 may include a determining module 1210 and a sending module 1220.

The determining module 1210 is configured to determine key credential information based on the smart vehicle key.

The sending module 1220 is configured to send the key credential information to a server.

In a possible implementation, the determining module 1210 is further configured to encrypt the smart vehicle key by using the smart vehicle key as a key, to obtain the key credential information.

In a possible implementation, the vehicle further includes vehicle identity identification information corresponding to the vehicle, and the determining module 1210 is further configured to sign the smart vehicle key and the vehicle identity identification information by using a first private key, to obtain signature data, obtain a second public key, and encrypt the signature data, the smart vehicle key, and the vehicle identity identification information by using the second public key, to obtain a first ciphertext, where the second public key is sent by the server to the vehicle, and generate the key credential information based on the first ciphertext and a first public key, where the first public key corresponds to the first private key.

In a possible implementation, the sending module 1220 is further configured to send a first certificate to the server, where the first certificate includes the vehicle identity identification information and the first public key, the first certificate is issued to the vehicle after being signed by a third-party authority, and the first certificate is used to verify the first public key.

In a possible implementation, the communication apparatus 1200 further includes a verification module configured to verify the second public key based on a second certificate.

In a possible implementation, the communication apparatus 1200 further includes a receiving module configured to receive the second certificate sent by the server, where the second certificate includes identity information of the server and the second public key, and the second certificate is issued to the server after being signed by the third-party authority.

In a possible implementation, the vehicle pre-stores a root certificate, and the root certificate is used to check a certificate. The communication apparatus 1200 further includes a signature verification module configured to perform signature verification on the second certificate based on the root certificate.

In a possible implementation, the second certificate is preset in the vehicle.

In a possible implementation, the first public key and the first private key are generated in a security module of the vehicle.

In a possible implementation, the smart vehicle key is generated in a factory mode of the vehicle.

In a possible implementation, the communication apparatus 1200 further includes an update module configured to periodically update the key credential information based on the smart vehicle key, and send updated key credential information to the server.

In a possible implementation, the sending module 1220 is further configured to send a key update prompt to a first electronic device, to prompt a user to update the smart vehicle key.

In a possible implementation, the receiving module is further configured to receive a key update request sent by a first electronic device, where the key update request is used to request to generate a new smart vehicle key, determine new key credential information based on the new smart vehicle key, and send the new key credential information to the server.

In a possible implementation, the key update request includes the old smart vehicle key, and the communication apparatus 1200 further includes an authentication module configured to perform authentication on the old smart vehicle key.

In a possible implementation, the communication apparatus 1200 further includes a deletion module configured to, if it is detected that authentication on a request of the first electronic device for using the new smart vehicle key succeeds, delete the old smart vehicle key in the vehicle.

Figure 13:
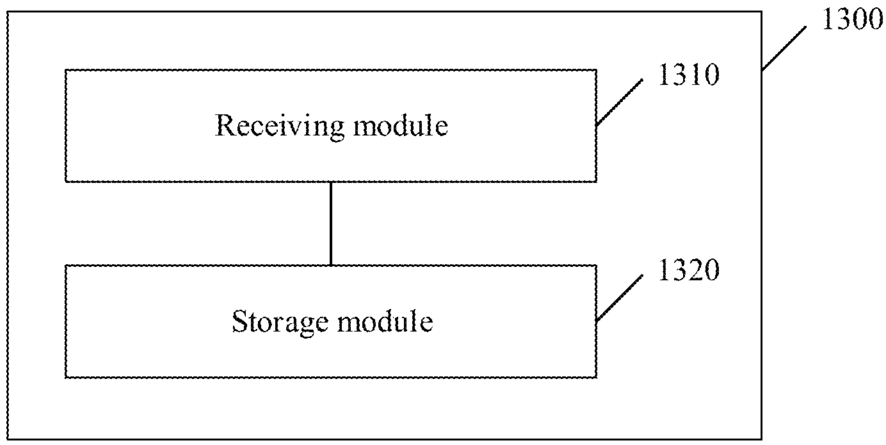
FIG. 13 is a schematic diagram of a structure of another embodiment of a communication apparatus according to this disclosure.

FIG. 13 is a schematic diagram of a structure of another embodiment of a communication apparatus according to this disclosure. As shown in FIG. 13, the communication apparatus 1300 is applied to a server, and may include a receiving module 1310 and a storage module 1320.

The receiving module 1310 is configured to receive key credential information.

The storage module 1320 is configured to perform secure storage on the key credential information, where the secure storage is storage performed by using a secure encryption means.

In a possible implementation, the key credential information includes a first ciphertext and a first public key, and the storage module 1320 is further configured to decrypt the first ciphertext by using a second private key, to obtain signature data, a smart vehicle key, and vehicle identity identification information, perform signature verification on the signature data by using the first public key, and if the signature verification succeeds, perform secure storage on the smart vehicle key and the vehicle identity identification information.

In a possible implementation, the communication apparatus 1300 further includes an obtaining module configured to obtain a third public key, and encrypt the smart vehicle key by using the third public key, to obtain an encrypted smart vehicle key, where the third public key is sent by a first electronic device to the server, and send the encrypted smart vehicle key to the first electronic device.

In a possible implementation, the receiving module 1310 is further configured to receive a registration request, where the registration request includes a user account and vehicle identity identification information corresponding to the user account, and create the user account based on the registration request, where the user account corresponds to the smart vehicle key and the vehicle identity identification information.

In a possible implementation, the communication apparatus 1300 further includes a sending module configured to send a second certificate to a vehicle, where the second certificate includes identity information of the server and a second public key, the second certificate is issued to the server after being signed by a third-party authority, and the second certificate is used to verify the second public key.

In a possible implementation, the communication apparatus 1300 further includes a verification module configured to verify the first public key based on a first certificate.

In a possible implementation, the receiving module 1310 is further configured to receive the first certificate sent by a vehicle, where the first certificate includes the vehicle identity identification information and the first public key, and the first certificate is issued to the vehicle after being signed by a third-party authority.

In a possible implementation, the server pre-stores a root certificate, and the root certificate is used to check a certificate. The communication apparatus 1300 further includes a signature verification module configured to perform signature verification on the first certificate based on the root certificate.

In a possible implementation, the first certificate is preset in the server.

In a possible implementation, the first public key is generated in a security module of a vehicle.

In a possible implementation, the receiving module 1310 is further configured to periodically receive the key credential information, to periodically update the key credential information.

In a possible implementation, the sending module is further configured to send a key update prompt to a first electronic device, to prompt a user to update the smart vehicle key.

In a possible implementation, the receiving module 1310 is further configured to receive a credential update indication, where the credential update indication indicates to update the key credential information, and the credential update indication includes new key credential information, and update the key credential information based on the credential update indication.

In a possible implementation, the credential update indication further includes the old smart vehicle key, the old smart vehicle key is stored in the server, the new key credential information includes a new smart vehicle key, and the communication apparatus 1300 further includes an authentication module configured to perform authentication on the old smart vehicle key.

In a possible implementation, the communication apparatus 1300 further includes a deletion module configured to, if it is detected that authentication on the new key credential information succeeds, store the new key credential information, and delete the old key credential information.

Figure 14:
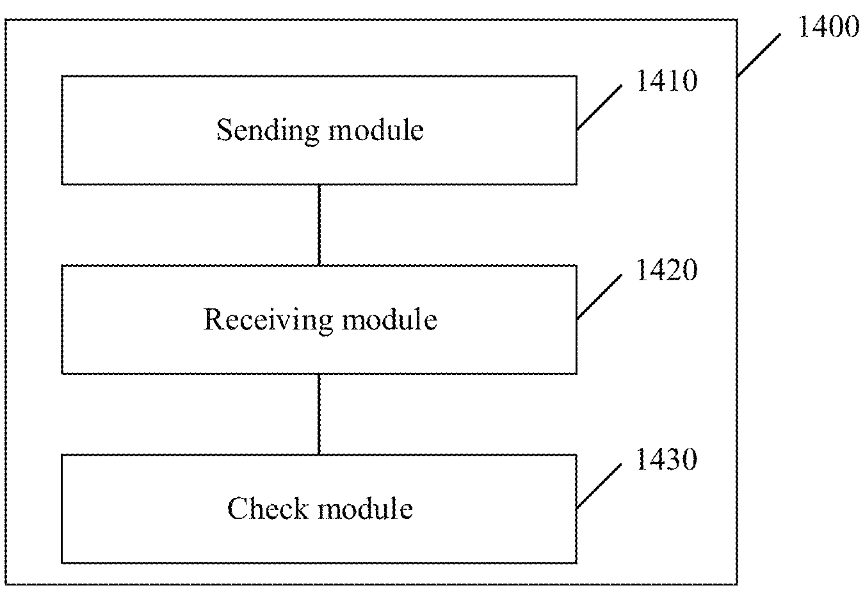
FIG. 14 is a schematic diagram of a structure of still another embodiment of a communication apparatus according to this disclosure.

FIG. 14 is a schematic diagram of a structure of an embodiment of a communication apparatus according to this disclosure. As shown in FIG. 14, the communication apparatus 1400 is applied to a vehicle, and may include a sending module 1410, a receiving module 1420, and a check module 1430.

The sending module 1410 is configured to send a random value to a first electronic device.

The receiving module 1420 is configured to receive a first control message sent by the first electronic device, where the first control message is generated based on a smart vehicle key and the random value.

The check module 1430 is configured to check the first control message based on the smart vehicle key and the random value, and control the vehicle based on the first control message if the check succeeds.

In a possible implementation, the check module 1430 is further configured to generate a second control message based on the smart vehicle key and the random value, compare the second control message with the first control message, and if the first control message is consistent with the second control message, control the vehicle based on the first control message.

Figure 15:
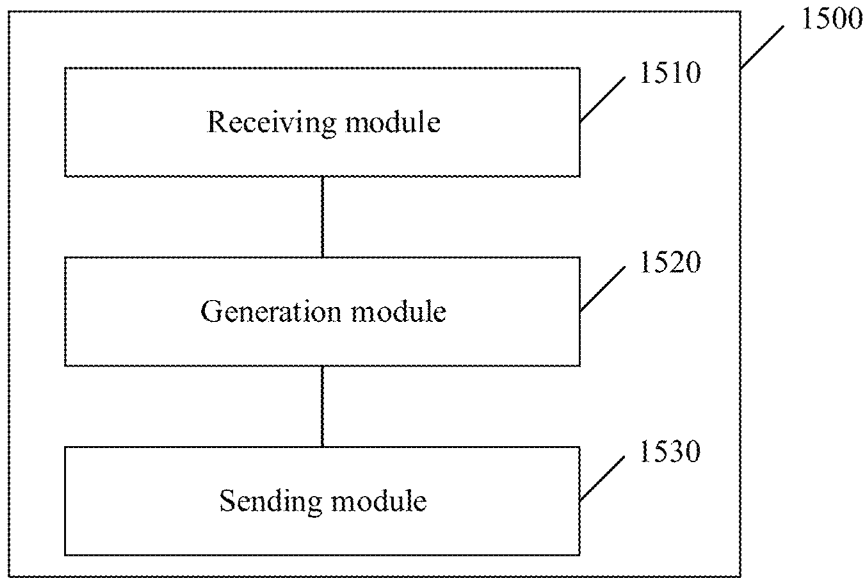
FIG. 15 is a schematic diagram of a structure of still another embodiment of a communication apparatus according to this disclosure.

FIG. 15 is a schematic diagram of a structure of another embodiment of a communication apparatus according to this disclosure. As shown in FIG. 15, the communication apparatus 1500 is applied to a first electronic device, and may include a receiving module 1510, a generation module 1520, and a sending module 1530.

The receiving module 1510 is configured to receive a random value sent by a vehicle.

The generation module 1520 is configured to obtain a smart vehicle key, and generate a first control message based on the smart vehicle key and the random value, where the first control message is used to control the vehicle.

The sending module 1530 is configured to send the first control message to the vehicle.

In a possible implementation, the first control message is generated in a TEE.

In a possible implementation, the generation module 1520 is further configured to receive an encrypted smart vehicle key sent by a server, where the encrypted smart vehicle key is obtained by the server by encrypting the smart vehicle key by using a third public key, and the third public key is sent by the first electronic device to the server, and decrypt the encrypted smart vehicle key by using a third private key, to obtain the smart vehicle key.

In a possible implementation, the third public key and the third private key are generated in a TEE of the first electronic device.

In a possible implementation, the generation module 1520 is further configured to decrypt, in a TEE of the first electronic device, the encrypted smart vehicle key by using the third private key, to obtain the smart vehicle key, and store the smart vehicle key in the TEE of the first electronic device.

In a possible implementation, the sending module 1530 is further configured to send a key request to the server, where the key request includes a user account, and the key request is used to obtain a smart vehicle key corresponding to the user account.

In a possible implementation, the sending module 1530 is further configured to send a key update request to the vehicle, where the key update request is used to generate a new smart vehicle key, and obtain the new smart vehicle key from a server.

In a possible implementation, the communication apparatus 1500 further includes an authentication module configured to perform authentication on the vehicle by using the new smart vehicle key, and if the authentication succeeds, delete the old smart vehicle key in the first electronic device.

Figure 16:
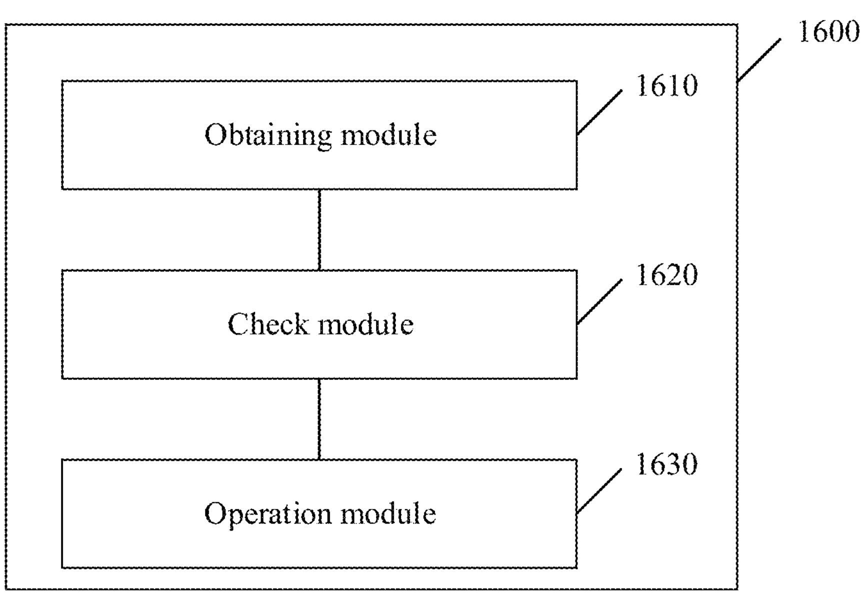
FIG. 16 is a schematic diagram of a structure of still another embodiment of a communication apparatus according to this disclosure.

FIG. 16 is a schematic diagram of a structure of an embodiment of a communication apparatus according to this disclosure. As shown in FIG. 16, the communication apparatus 1600 is applied to a vehicle, and may include an obtaining module 1610, a check module 1620, and an operation module 1630.

The obtaining module 1610 is configured to obtain an operation request sent by a second electronic device, where the operation request includes a temporary key and a control instruction.

The check module 1620 is configured to check the temporary key, and perform a time validity check based on a first valid time period, where the first valid time period is used to represent a valid time period of the temporary key, and the first valid time period is stored in a security module of the vehicle.

The operation module 1630 is configured to, if the check of the temporary key succeeds and the time validity check succeeds, operate the vehicle based on the control instruction of the second electronic device.

In a possible implementation, the obtaining module 1610 is further configured to obtain a vehicle use request, where the vehicle use request includes the first valid time period, generate the temporary key based on the first valid time period, and send the temporary key to a server.

In a possible implementation, the vehicle use request is sent by the first electronic device in a short-range communication manner.

In a possible implementation, the vehicle use request is sent by the first electronic device through a mobile network.

In a possible implementation, the vehicle use request further includes a signed smart vehicle key, the signed smart vehicle key is obtained by signing a smart vehicle key by using a third private key. The communication apparatus 1600 further includes a signature verification module configured to perform signature verification on the smart vehicle key based on a third public key, where the third public key is sent by the first electronic device to the vehicle.

In a possible implementation, the communication apparatus 1600 further includes a sending module configured to send a first certificate to the first electronic device, where the first certificate includes vehicle identity identification information and a first public key, the first certificate is issued to the vehicle after being signed by a third-party authority, and the first certificate is used to verify the first public key.

In a possible implementation, the communication apparatus 1600 further includes a verification module configured to verify the third public key based on a third certificate.

In a possible implementation, the communication apparatus 1600 further includes a receiving module configured to receive the third certificate sent by the first electronic device, where the third certificate includes identity information of the first electronic device and the third public key, and the third certificate is issued to the first electronic device after being signed by a third-party authority.

In a possible implementation, the vehicle pre-stores a root certificate, and the root certificate is used to check a certificate. The signature verification module is further configured to perform signature verification on the third certificate based on the root certificate.

In a possible implementation, the first valid time period is encrypted by using a smart vehicle key. The communication apparatus 1600 further includes a decryption module configured to decrypt an encrypted first valid time period by using the smart vehicle key, and perform secure storage on a decrypted first valid time period.

In a possible implementation, the receiving module is further configured to receive encrypted data sent by the second electronic device, where the encrypted data is obtained by encrypting a temporary credential and the first valid time period by using a smart vehicle key, the smart vehicle key is stored in a first electronic device, and the temporary credential is generated by the first electronic device, decrypt the encrypted data by using the smart vehicle key, to obtain the temporary credential and the first valid time period, check the temporary credential and the first valid time period, if the check succeeds, generate the temporary key, and encrypt the temporary key based on the encrypted data, to obtain an encrypted temporary key, and send the encrypted temporary key to the second electronic device.

In a possible implementation, the communication apparatus 1600 further includes a storage module configured to perform secure storage on the first valid time period.

In a possible implementation, the temporary credential is generated based on the smart vehicle key and the first valid time period, and the encrypted data is sent by the first electronic device to a server.

In a possible implementation, the operation request includes an encrypted temporary key, and the encrypted temporary key is obtained after being encrypted by using a first public key. The decryption module is further configured to decrypt the encrypted temporary key by using a first private key, to obtain the temporary key.

In a possible implementation, the sending module is configured to send a first certificate to the second electronic device, where the first certificate includes vehicle identity identification information and the first public key, the first certificate is issued to the vehicle after being signed by a third-party authority, and the first certificate is used to verify the first public key.

In a possible implementation, the verification module is further configured to verify a fourth public key based on a fourth certificate, where the fourth public key is sent by the second electronic device to the vehicle.

In a possible implementation, the receiving module is further configured to receive the fourth certificate sent by the second electronic device, where the fourth certificate includes identity information of the second electronic device and the fourth public key, and the fourth certificate is issued to the second electronic device after being signed by a third-party authority.

In a possible implementation, the vehicle pre-stores a root certificate, and the root certificate is used to check a certificate. The signature verification module is further configured to perform signature verification on the fourth certificate based on the root certificate.

In a possible implementation, the sending module is further configured to send a random value to the second electronic device, receive a first control message sent by the second electronic device, where the first control message is generated based on the temporary key and the random value, and perform a temporary key check on the first control message based on the temporary key and the random value.

In a possible implementation, the sending module is further configured to send a key invalidation notification to the second electronic device, where the key invalidation notification indicates that the temporary key is invalid.

In a possible implementation, the communication apparatus 1600 further includes a setting module configured to, if it is detected that a current system time exceeds the first valid time period, set the temporary key to be invalid.

In a possible implementation, the communication apparatus 1600 further includes a prompt module configured to, if the time validity check fails, prompt the user that the temporary key is expired.

Figure 17:
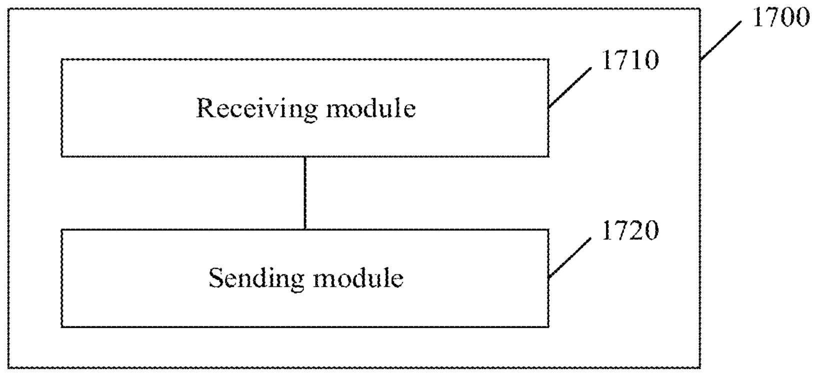
FIG. 17 is a schematic diagram of a structure of still another embodiment of a communication apparatus according to this disclosure.

FIG. 17 is a schematic diagram of a structure of another embodiment of a communication apparatus according to this disclosure. As shown in FIG. 17, the communication apparatus 1700 is applied to a server, and may include a receiving module 1710 and a sending module 1720.

The receiving module 1710 is configured to receive a key obtaining request sent by a second electronic device, where the key obtaining request is used to request to obtain first information, and the first information is used to determine a temporary key.

The sending module 1720 is configured to send the first information to the second electronic device.

In a possible implementation, the first information is the temporary key. The sending module 1720 is further configured to encrypt the temporary key by using a fourth public key, and send the encrypted temporary key to the second electronic device, where the fourth public key is sent by the second electronic device to the server.

In a possible implementation, the temporary key is sent by a vehicle to the server.

In a possible implementation, the first information is encrypted data. The sending module 1720 is further configured to send the encrypted data to the second electronic device, where the encrypted data is obtained by encrypting a temporary credential and a first valid time period by using a smart vehicle key, the smart vehicle key is stored in a first electronic device, the temporary credential is generated by the first electronic device, and the first valid time period is used to represent a valid time period of the temporary key.

In a possible implementation, the encrypted data is sent by the first electronic device to the server.

In a possible implementation, the key obtaining request includes a temporary account, and the key obtaining request is used to request to obtain the first information corresponding to the temporary account.

Figure 18:
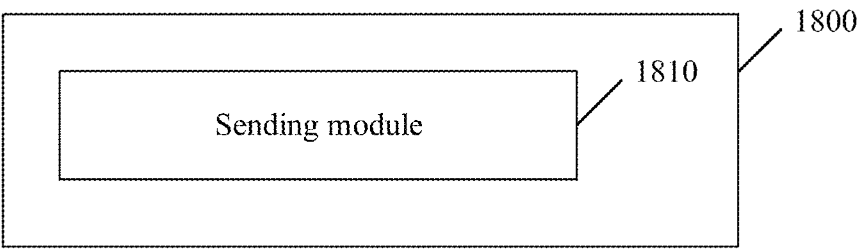
FIG. 18 is a schematic diagram of a structure of still another embodiment of a communication apparatus according to this disclosure.

FIG. 18 is a schematic diagram of a structure of an embodiment of a communication apparatus according to this disclosure. As shown in FIG. 18, the communication apparatus 1800 is applied to a first electronic device, and may include a sending module 1810.

The sending module 1810 is configured to send second information in response to a detected vehicle use operation of a user, where the second information is used to determine a temporary key.

In a possible implementation, the sending module 1810 is further configured to send a vehicle use request to a vehicle in response to the detected vehicle use operation of the user, where the vehicle use request includes a first valid time period.

In a possible implementation, the first valid time period is encrypted by using a smart vehicle key.

In a possible implementation, the vehicle use request further includes a smart vehicle key.

In a possible implementation, the sending module 1810 is further configured to generate a temporary credential based on a smart vehicle key and a first valid time period in response to the detected vehicle use operation of the user, and encrypt the temporary credential and the first valid time period by using the smart vehicle key, to obtain encrypted data, and send the encrypted data to a server.

Figure 19:
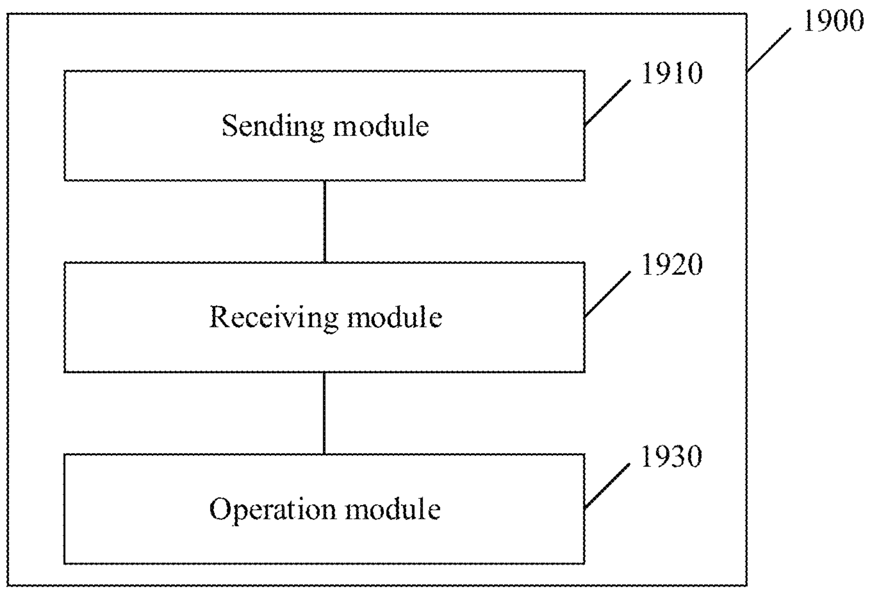
FIG. 19 is a schematic diagram of a structure of still another embodiment of a communication apparatus according to this disclosure.

FIG. 19 is a schematic diagram of a structure of another embodiment of a communication apparatus according to this disclosure. As shown in FIG. 19, the communication apparatus 1900 is applied to a second electronic device, and may include a sending module 1910, a receiving module 1920, and an operation module 1930.

The sending module 1910 is configured to send a key obtaining request to a server, where the key obtaining request is used to request to obtain first information, and the first information is used to determine a temporary key.

The receiving module 1920 is configured to receive the first information sent by the server.

The operation module 1930 is configured to send an operation request to a vehicle based on the first information, where the operation request includes the temporary key and a control instruction, and the control instruction is used to operate the vehicle.

In a possible implementation, the first information is an encrypted temporary key, and the encrypted temporary key is obtained by encrypting the temporary key by using a fourth public key.

In a possible implementation, the communication apparatus 1900 further includes a decryption module configured to decrypt the encrypted temporary key by using the fourth private key, to obtain the temporary key.

In a possible implementation, the first information is encrypted data, the encrypted data is obtained by encrypting a temporary credential and a first valid time period by using a smart vehicle key, the smart vehicle key is stored in a first electronic device, the temporary credential is generated by the first electronic device, and the first valid time period is used to represent a valid time period of the temporary key.

In a possible implementation, the receiving module 1920 is further configured to receive a key invalidation notification, where the key invalidation notification indicates that the temporary key is invalid.

In a possible implementation, the key obtaining request further includes a temporary account, and the key obtaining request is used to request to obtain the first information corresponding to the temporary account.

Figure 20:
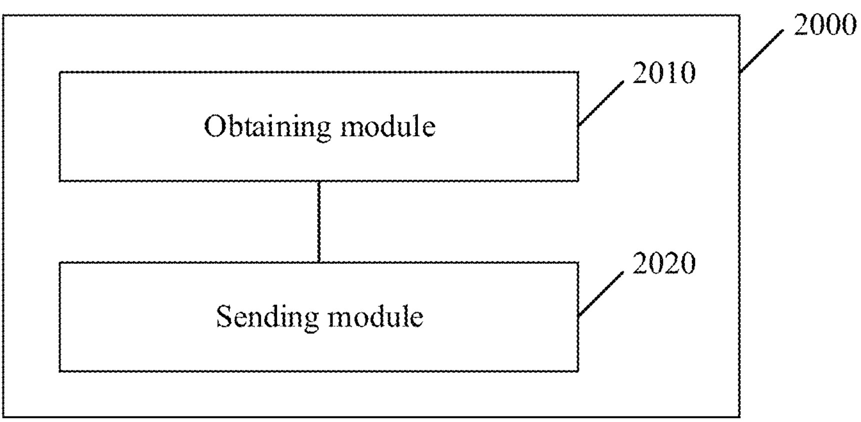
FIG. 20 is a schematic diagram of a structure of still another embodiment of a communication apparatus according to this disclosure.

FIG. 20 is a schematic diagram of a structure of an embodiment of a communication apparatus according to this disclosure. As shown in FIG. 20, the communication apparatus 2000 is applied to a vehicle rental platform, and may include an obtaining module 2010 and a sending module 2020.

The obtaining module 2010 is configured to obtain a first valid time period, and obtain a smart vehicle key from a server.

The sending module 2020 is configured to encrypt the first valid time period by using the smart vehicle key as a key, and send an encrypted first valid time period to a vehicle.

In a possible implementation, the communication apparatus 2000 further includes an application module configured to apply for a temporary account from the server, where the temporary account corresponds to a temporary key, and send the temporary account to a second electronic device.

In a possible implementation, the sending module 2020 is further configured to send a key invalidation notification, where the key invalidation notification indicates that the temporary key is invalid.

The communication apparatuses provided in the embodiments shown in FIG. 12 to FIG. 20 may be configured to perform the technical solutions in the method embodiments shown in FIG. 1 to FIG. 11 of this disclosure. For implementation principles and technical effects thereof, refer to related descriptions in the method embodiments.

It should be understood that division into the modules of the communication apparatuses shown in FIG. 11 to FIG. 20 is merely logical function division. During actual implementation, all or some of the modules may be integrated into one physical entity or may be physically separated. In addition, all the modules may be implemented in a form of software invoked by a processing element, or may be implemented in a form of hardware, or some modules may be implemented in a form of software invoked by a processing element, and some modules are implemented in a form of hardware. For example, a detection module may be a separately disposed processing element, or may be integrated into a chip of an electronic device for implementation. An implementation of another module is similar to the implementation of the detection module. In addition, all or some of these modules may be integrated, or may be implemented independently. In an implementation process, steps in the foregoing methods or the foregoing modules may be implemented by using an integrated logical circuit of hardware in the processing element, or by using instructions in a form of software.

For example, the foregoing modules may be one or more integrated circuits configured to implement the foregoing methods, for example, one or more application-specific integrated circuits (ASICs), or one or more microprocessors (such as DSPs), or one or more field-programmable gate arrays. (FPGAs) or the like. For another example, the modules may be integrated together, and implemented in a form of a system-on-a-chip (SOC).

Based on the foregoing descriptions of the implementations, a person skilled in the art may clearly understand that for the purpose of convenient and brief descriptions, division into the foregoing function modules is merely used as an example for description. During actual application, the foregoing functions can be allocated to different function modules for implementation based on a requirement, that is, an inner structure of an apparatus is divided into different function modules to implement all or some of the functions described above. For a specific working process of the foregoing system, apparatus, and unit, refer to a corresponding process in the foregoing method embodiments, and details are not described herein again.

Function units in embodiments of this disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions in embodiments may be implemented in a form of a software product. The computer software product is stored in a storage medium, and includes several instructions for instructing a computer device (which may be a personal computer, a server, or a network device) or a processor to perform all or some of the steps of the methods described in embodiments of this disclosure. The foregoing storage medium includes any medium that can store program code, such as a flash memory, a removable hard disk, a read-only memory, a RAM, a magnetic disk, or an optical disc.

The foregoing descriptions are merely specific implementations of this disclosure, but are not intended to limit the protection scope of this disclosure. Any variation or replacement within the technical scope disclosed in this disclosure shall fall within the protection scope of this disclosure.

Therefore, the protection scope of this disclosure shall be subject to the protection scope of the claims.

What is claimed is:

1. A method implemented by a vehicle, wherein the method comprises:

obtaining, from a second electronic device, an operation request comprising a temporary key and a control instruction;

checking the temporary key;

performing a time validity check based on a first valid time period corresponding to the temporary key;

operating, based on the control instruction, the vehicle when checking the temporary key and the time validity check have succeeded;

receiving, from the second electronic device, encrypted data based on encryption of a temporary credential of a first electronic device and the first valid time period using a smart vehicle key, wherein the temporary credential is based on the smart vehicle key and the first valid time period;

decrypting, using the smart vehicle key, the encrypted data to obtain the temporary credential and the first valid time period;

checking the temporary credential and the first valid time period;

generating the temporary key when checking the temporary credential and the first valid time period have succeeded;

encrypting, based on the encrypted data, the temporary key to obtain an encrypted temporary key; and sending, to the second electronic device, the encrypted temporary key.

2. The method of claim 1, wherein before obtaining the operation request, the method further comprises:

obtaining a vehicle use request comprising the first valid time period;

generating, based on the first valid time period, the temporary key; and sending, to a server, the temporary key.

3. The method of claim 2, wherein obtaining the vehicle use request comprises receiving, from the first electronic device in a short-range communication manner, the vehicle use request.

4. The method of claim 2, wherein obtaining the vehicle use request comprises receiving, from the first electronic device through a mobile network, the vehicle use request.

5. The method of claim 2, wherein obtaining the vehicle use request comprises receiving, from a vehicle rental platform, the vehicle use request.

6. The method of claim 2, further comprising signing the smart vehicle key using a private key to obtain a signed smart vehicle key, wherein the vehicle use request further comprises the signed smart vehicle key and wherein after obtaining the vehicle use request, the method further comprises:

receiving, from the first electronic device, a first public key; and performing a first signature verification on the signed smart vehicle key based on the first public key.

7. The method of claim 6, further comprising sending, to the first electronic device, a certificate comprising vehicle identity identification information and a second public key, wherein the certificate is signed by a third-party authority and verifies the second public key.

8. The method of claim 6, further comprising verifying, based on a certificate, the first public key.

9. The method of claim 8, wherein before verifying the first public key, the method further comprises receiving, from the first electronic device, the certificate, wherein the certificate comprises identity information of the first electronic device and the first public key, and wherein the certificate is signed by a third-party authority.

10. The method of claim 9, further comprising:

pre-storing a root certificate for checking the certificate; and performing a second signature verification on the certificate based on the root certificate.

11. The method of claim 6, wherein the first valid time period is encrypted using the smart vehicle key, and wherein the method further comprises:

decrypting, using the smart vehicle key, an encrypted first valid time period to obtain a decrypted first valid time period; and performing secure storage on the decrypted first valid time period.

12. The method of claim 1, wherein after generating the temporary key, the method further comprises performing secure storage on the first valid time period.

13. The method of claim 1, wherein the operation request comprises the encrypted temporary key that is based on a first public key, and wherein before checking the temporary key, the method further comprises decrypting, using a private key, the encrypted temporary key to obtain the temporary key.

14. The method of claim 13, further comprising sending, to the second electronic device, a certificate comprising vehicle identity identification information and the first public key, wherein the certificate is signed by a third-party authority and verifies the first public key.

15. The method of claim 13, further comprising:

receiving, from the second electronic device, a second public key; and verifying, based on a certificate, the second public key.

16. The method of claim 15, wherein before verifying the second public key, the method further comprises receiving, from the second electronic device, the certificate, wherein the certificate comprises identity information of the second electronic device and the second public key, and wherein the certificate is signed by a third-party authority.

17. A vehicle comprising:

a memory configured to store instructions; and one or more processors coupled to the memory, wherein when executed by the one or more processors, the instructions cause the vehicle to:

obtain an operation request comprising a temporary key and a control instruction;

check the temporary key;

perform a time validity check based on a valid time period corresponding to the temporary key;

operate, based on the control instruction, the vehicle when checking the temporary key and the time validity check have succeeded;

receive encrypted data based on encryption of a temporary credential of a first electronic device and the valid time period using a smart vehicle key, wherein the temporary credential is based on the smart vehicle key and the valid time period;

decrypt, using the smart vehicle key, the encrypted data to obtain the temporary credential and the valid time period;

check the temporary credential and the valid time period;

generate the temporary key when checking the temporary credential and the valid time period have succeeded;

encrypt, based on the encrypted data, the temporary key to obtain an encrypted temporary key; and send the encrypted temporary key.

18. A computer program product comprising computer-executable instructions that are stored on a non-transitory computer-readable storage medium and that, when executed by one or more processors, cause a vehicle to:

obtain an operation request comprising a temporary key and a control instruction;

check the temporary key;

perform a time validity check based on a first valid time period corresponding to the temporary key;

operate, based on the control instruction, the vehicle when checking the temporary key and the time validity check have succeeded;

receive encrypted data based on encryption of a temporary credential of a first electronic device and the first valid time period using a smart vehicle key, wherein the temporary credential is based on the smart vehicle key and the first valid time period;

decrypt, using the smart vehicle key, the encrypted data to obtain the temporary credential and the first valid time period;

check the temporary credential and the first valid time period;

generate the temporary key when checking the temporary credential and the first valid time period have succeeded;

encrypt, based on the encrypted data, the temporary key to obtain an encrypted temporary key; and send the encrypted temporary key.

* * * * *